United States Patent [19]
Goldman

[11] 4,423,415
[45] Dec. 27, 1983

[54] NON-COUNTERFEITABLE DOCUMENT SYSTEM

[75] Inventor: Robert N. Goldman, Kailua, Hi.

[73] Assignee: Light Signatures, Inc., Los Angeles, Calif.

[21] Appl. No.: 276,282

[22] Filed: Jun. 22, 1981

Related U.S. Application Data

[63] Continuation-in-part of Ser. No. 161,838, Jun. 23, 1980, abandoned.

[51] Int. Cl.³ .................... H04Q 9/00; G06K 19/00; G06K 5/00
[52] U.S. Cl. .................... 340/825.34; 235/382; 235/454; 235/493
[58] Field of Search ............... 235/381, 382, 493, 487, 235/454, 435; 340/825.34

[56] References Cited

U.S. PATENT DOCUMENTS

| | | |
|---|---|---|
| 3,108,692 | 10/1963 | Patzer . |
| 3,457,421 | 7/1969 | Bayha . |
| 3,753,617 | 8/1973 | Ehrat . |
| 3,782,543 | 1/1974 | Martelli . |
| 3,836,754 | 9/1974 | Toye et al. ............... 235/454 |
| 3,916,194 | 10/1975 | Novak et al. . |
| 3,922,090 | 11/1975 | Fain . |
| 3,947,661 | 3/1976 | Silverman et al. ............... 235/382 |
| 3,959,630 | 5/1976 | Hogberg ............... 235/487 |
| 4,025,759 | 5/1977 | Scheffel ............... 235/487 |
| 4,056,731 | 11/1977 | Bayha . |
| 4,066,910 | 1/1978 | Swift ............... 235/454 |
| 4,094,462 | 6/1978 | Moschner . |
| 4,114,032 | 9/1978 | Brosow et al. ............... 235/493 |
| 4,139,779 | 2/1979 | Ehrat . |
| 4,147,430 | 4/1979 | Gorgone et al. . |
| 4,175,774 | 11/1979 | Tonges et al. . |
| 4,179,685 | 12/1979 | O'Maley . |
| 4,213,038 | 7/1980 | Silverman et al. ............... 235/381 |
| 4,218,674 | 8/1980 | Brosow et al. ............... 340/825.34 |

FOREIGN PATENT DOCUMENTS 1546053 1/1978 United Kingdom .

OTHER PUBLICATIONS

U. K. Patent Application 2,067,322, Stockburger.
R. Alan, *Counterfeit and Impostor Resistant Machine Readable ID Card System*, Apr. 1977, The Mitre Corporation, Box 208, Bedford, MA.
*Proposed Fugi Perfect Identification Security System (PIDSS) for Issue of PID Engraved Card and/or Paper and Retrieval System of Character Data and/or Picture Data (Total System)*, Fugi Electric Co., Ltd., May 1978.
"Scrambling to Foil Forgers", Product Design Column, *Business Week*, Apr. 13, 1981.

*Primary Examiner*—Donald J. Yusko
*Attorney, Agent, or Firm*—Nilsson, Robbins, Dalgarn, Berliner, Carson & Wurst

[57] ABSTRACT

A system is disclosed for authenticating an object on the basis of certain physical phenomena or character, specifically, measurable, but not practicably duplicable random variations in the object. In one form, the object (authenticator (T)) is a paper tag having a reference space (14), the varying translucency pattern of which is a measurable but practicably unduplicable characteristic of the paper. The reference space (14) is sensed to provide reference signals indicative of the varying translucency. A reference numeral (10) is then provided from some registered form, as on the tag or in a list. If the numeral (10) is readily accessible, it likely will be cryptographically encoded. Note the value of putting encoded information on the tag to avoid the need for large reference files.

For verification, freshly sensed reference signals, as from the tag (T) (actually characteristic of the tag) are compared with signals that previously were sensed as characteristic of the tag (T). Structures are disclosed as specific forms of the authenticator (T), along with apparatus for authenticator production, detection and manipulation. Different forms of tags (210) are disclosed, the measurable characteristic of which involves light transmissivity and reflectivity. Apparatus (111) for spectrographic confirmation of tag material is also disclosed. In an illustrative form of a tag (T) as an identification means, tags and processing apparatus utilize magnetic medium (218) and printed images (214). The magnetic medium is also disclosed to be recorded as for developing information on shelf life and sales channels.

40 Claims, 19 Drawing Figures

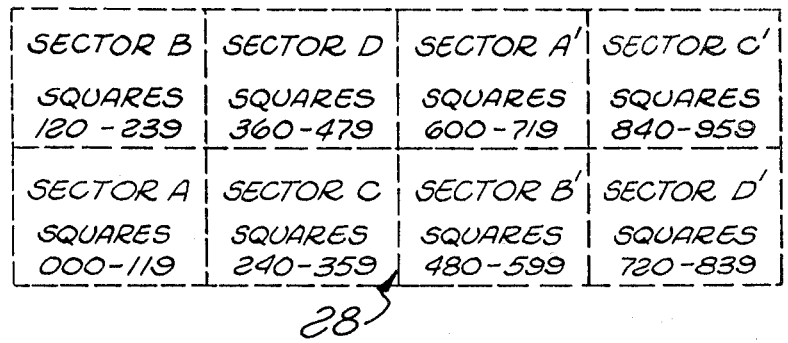
FIG.6
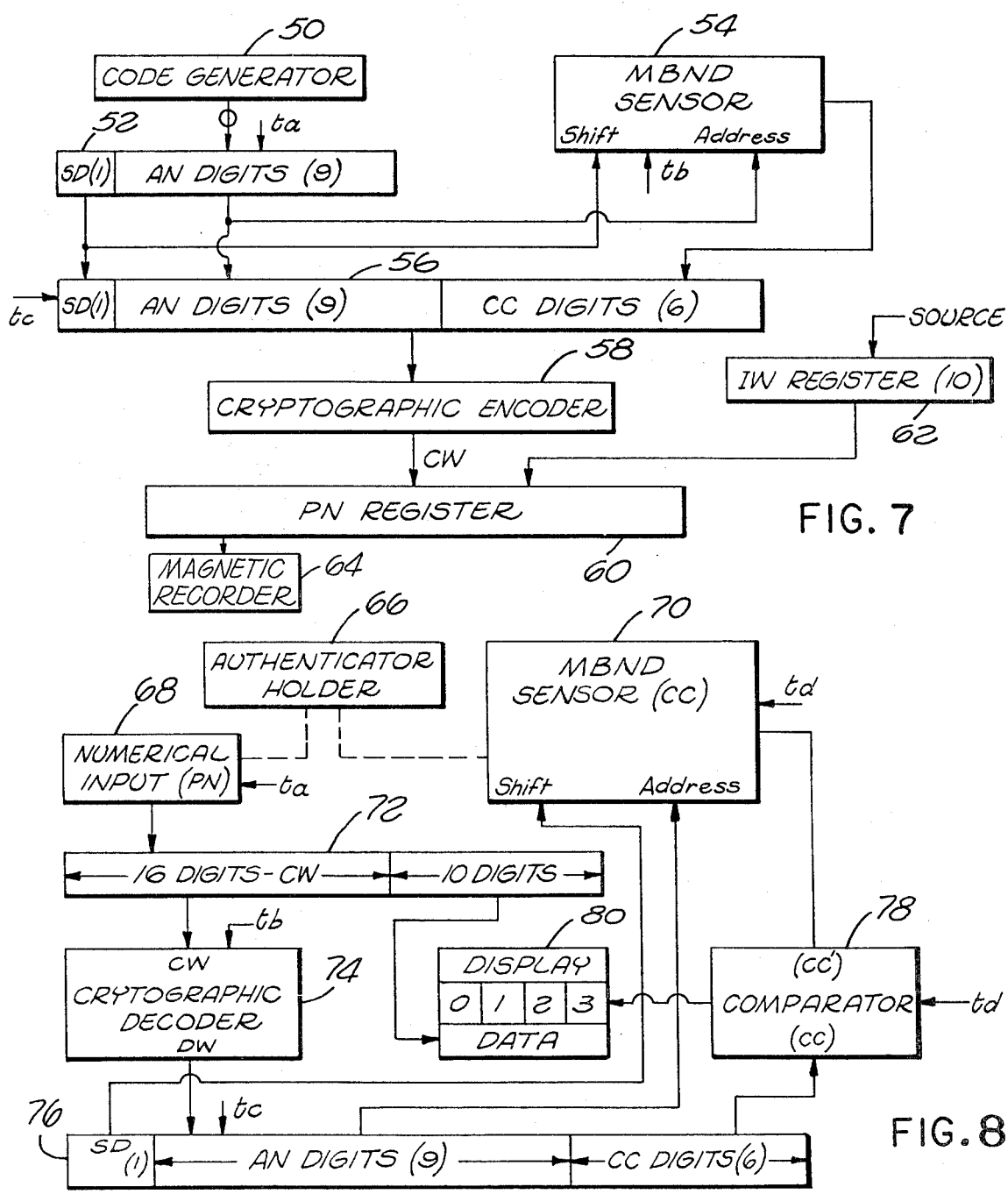
FIG. 7
FIG. 8

NON-COUNTERFEITABLE DOCUMENT SYSTEM

RELATED SUBJECT MATTER

This is a continuation-in-part of Ser. No. 161,838 filed June 23, 1980, abandoned and entitled "Non-Counterfeitable Document System".

BACKGROUND AND SUMMARY OF THE INVENTION

A growing need exists for a practical system of identification for use in various specific applications to segregate counterfeits, imitations or fakes from genuine articles. Regarding commercial products, several indicators suggest that ever increasing numbers of fakes are appearing in a wide variety of different merchandise lines. The piracy of recorded material, e.g. phonograph records, audio tapes, and video tapes, has been a recognized problem for some time. However, the practice of marketing fakes now has grown to encompass many other products. Successful products bearing prestigious trademarks are copied in detail for fraudulent sales. Unfortunately, although legal remedies often exist to curtail the sales of such counterfeits, detection and enforcement often is difficult and expensive. To compound the problem, many fakes cannot be readily detected without careful study or inspection by a professional. In view of the various difficulties and the existing conditions, a considerable need exists for an economical, practical system to verify or authenticate genuine articles both in the interests of preserving trademark or brand integrity and protecting the public from fraudulent copies.

In the past, a wide variety of techniques have been used for trying to distinguish genuine articles from fakes. For example, finely printed labels have been used in the hope that counterfeiters could not make duplicates. However, present highly developed reproduction technology enables the duplication of very complex graphics with relatively little difficulty.

Individual serial numbers or other identifications have also been applied to products for the purpose of authentication. Yet, failing either complete cooperation from sales people, or a comprehensive detection and policing program, such techniques afford little protection against copies. As a result of such difficulties, product pirates have been relatively free to pick and choose from a current group of successful products that could be copied, the fakes to be sold on a global scale with relative impunity.

In addition to commercial products, authentication is important in a variety of other applications as for commercial paper, identification cards, documents of value, and so on. As disclosed herein, the system of the present invention may be variously implemented to authenticate a wide range of subjects, including people.

The present invention is based on recognizing that an effective system of authentication can utilize a device with an obscure random characteristic. The system also recognizes that objects with such characteristics are readily available so that authentication devices hereof can be produced and used inexpensively, enabling selective investigation. For example, a producer can provide his full line of products with an authenticator, then limit policing activities to either sample groups or those select, very successful products that are most likely to be copied.

In operation, the present system employs select physical phenomena that characterize objects. Each phenomenon is measurable, but not practicably duplicable. Consider an example. The pattern of translucency variation in a sheet of ordinary bond paper may be seen by exposing the sheet to back lighting. That complex and random pattern of varying translucency is measurable but not practicably duplicable. Of course, such a randomly occurring pattern can be altered, for example, as by adding printing; however, the random character of the non-printed portion of the medium cannot be duplicated by a practicable effort. The present invention is based upon utilizing such a medium having such a measurable but not practicably duplicable characteristic for identification. Note that the characteristic being considered occurs randomly in nature, or in the production of a medium (without control) to provide a basis for identification data. such a randomly occurring characteristic is distinct from the operation of printing or otherwise designating a medium with a randomly generated numeral or similar data. It is the inherent random character of production or nature in a medium that is measurable but substantially unduplicable.

To consider another example, random variations in the naturally resulting reflectivity of a medium may be used as a measurable, but not practicably duplicable characteristic.

The medium may, for example, comprise: part of a product, part of a tag attached to a product, part of an identification device, part of a document of value, and so on. As a further aspect of the present discovery, the system may be implemented so that only a portion of the medium is utilized, and the location of that select portion is preserved in secrecy along with the measured characteristic.

In accordance with one technique of the present invention, a reference medium is sensed or measured to provide electrical reference signals representative of the select random pattern that is characteristic of the medium, but not practicably duplicable in a similar medium. Confirmation of that specific medium then involves another sensing of the medium and a comparison with the results of the original sensing.

In one exemplary application, reference signals identifying a pattern and its location are cryptographically encoded and recorded on the medium to provide a self-contained tag. Pursuing such an example in more detail, assume that the physical medium of the authenticators comprises bond paper. A defined area of each sheet of paper has a specified pattern of selected locations. Based on the characteristic of that pattern (and its location), reference signals are generated to be encoded and associated with the sheet, e.g. printed or otherwise recorded, as on the sheet. To authenticate such a sheet, the system of the present invention senses it to again detect or measure the selected pattern of authentication signals. The fresh signals are then compared to the recorded reference signals previously developed from the pattern. Coincidence of the signals indicates the sheet to be genuine.

As disclosed in detail below, the system hereof may be variously implemented using different media and techniques. For example, the location of the random pattern of concern may be visually obscure and can be crytographically encoded by a computer apparatus. Also, the characteristic reference signals can be variously stored for future comparisons. Some or all of such signals might be kept on a list, or cryptographically encoded and recorded, in memory, or optically or magnetically on the authenticator media.

BRIEF DESCRIPTION OF THE DRAWINGS

In the drawings, which constitute a part of this specification, exemplary embodiments of the invention are set forth as follows:

FIG. 6 is a diagrammatic view illustrating a detailed array format for specifying a pattern in the tag of FIG. 1;

FIG. 7 is a block diagram of a tag production system in accordance with the present invention;

FIG. 8 is a block diagram of a tag authentication system in accordance with the present invention;

DESCRIPTION OF THE ILLUSTRATIVE EMBODIMENTS

As indicated above, detailed illustrative embodiments of the present invention are disclosed herein. However, physical identification media, data formats, and operating systems structured in accordance with the present invention may be embodied in a wide variety of forms, some of which may be quite different from those of the disclosed embodiments. Consequently, the specific structural and functional details disclosed herein are merely representative; yet in that regard, they are deemed to afford the best embodiment for purposes of disclosure and to provide a basis for the claims herein which define the scope of the present invention.

Figure 1:
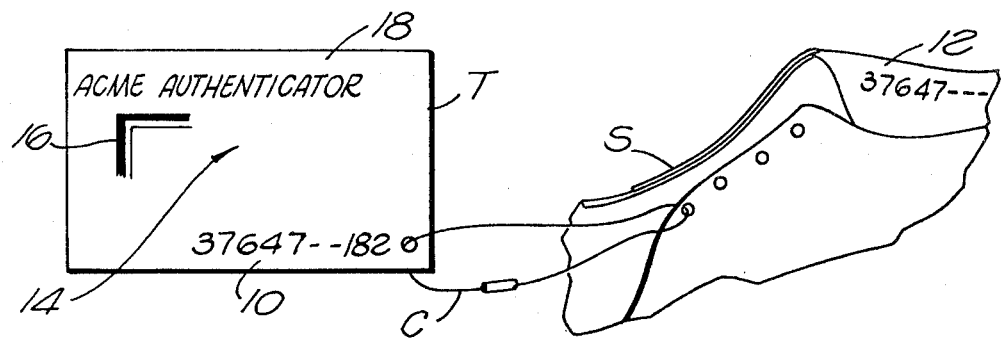
FIG. 1 is a perspective view of an authenticator tag according to the present invention illustrated for use in association with a product.

Referring initially to FIG. 1, a shoe S is fragmentarily represented along with an authenticator tag T which is securely attached to the shoe by a cord C. The tag T carries a legend in the form of a reference number 10 which may be duplicated in the shoe, e.g. number 12. In general, the system of the present invention enables authentication of the tag T to verify that the shoe S is a genuine article. First, the tag T is identified with the shoe S by the similar numbers 10 and 12. However, more significantly, the number 10 indicates and specifies a measurable but not practicably duplicable physical characteristic of the tag T. Specifically, in a space 14 (generally designated on the tag T) a field of locations (array of squares) is defined (not actually marked in detail) which has a characteristic measurable, but not practicably duplicable pattern of variations in translucency. The location of that pattern and its forms are defined by a representative number that is cryptographically related to the identical numbers 10 and 12. That is, a pattern of locations in the space 14 and their translucency are coded into the reference number 10.

It is to be realized that the tag T (if authentic) verifies the genuine nature of the particular shoe S only because the identification numbers 10 and 12 coincide. For an alternative more direct authentication, the medium of the space 14 may be integrated in the actual product that is to be identified, or other codes can be employed. For example, in the case of art work, e.g., signed graphic prints, a marginal area of the sheet of paper bearing the print may serve to provide the pattern of measurable but not duplicable random variations. For other products, other characteristics can be utilized. However, note that a specific tag T may be employed only to identify a single article. That is, while the tag T might be affixed to a fake duplicate of the shoe S, such a switch to the counterfeit shoe would leave the genuine shoe S without an authenticator thereby presumably reducing its value.

In alternative implementations, the tag T might be completely blank or could carry only an indication of the coded locations. In such implementations, the pattern locations could be uniform and the information on the characteristic pattern could be kept on an inventory or list of specific products or objects. Comparing a freshly sensed characteristic pattern with the recorded characteristic pattern would then authenticate a product. Such implementations could be desirable for items of limited production or large monetary value, e.g., graphic art prints.

To pursue the illustrative tag T in somewhat greater detail, the space 14 simply appears as a blank area that is located by a corner indicia 16. Several predetermined small secret areas (perhaps different on each authenticator tag) in the space 14 have measured translucencies. Such a set of translucency values is coded in the reference number 10. That is, the encoded number 10 indicates the locations of the small secret areas and their translucency values. The number 10 also includes certain miscellaneous data, e.g. coding data, a date, codes used, a product serial or batch number, and so on.

In addition to the reference number 10 and the corner indicia 16, the tag T usually will also carry a trademark or other identification indicia 18. Note also that the space 14 may be enhanced as disclosed below with printing, to visually appear as an image, design or pattern so long as the measurable but not duplicable characteristic (random in the manufacture) is preserved.

Figure 2:
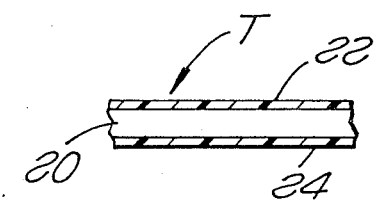
FIG. 2 is a fragmentary sectional view taken through the tag of FIG. 1.

Considering the physical form of the tag T in somewhat greater detail, it may be desirable to include protective laminate layers. Specifically, as illustrated in FIG. 2, the tag T comprises a sheet 20 of bond paper laminated between a pair of protective clear layers 22 and 24. A durable and stable tag T with a plane reference surface is the result.

Figure 3:
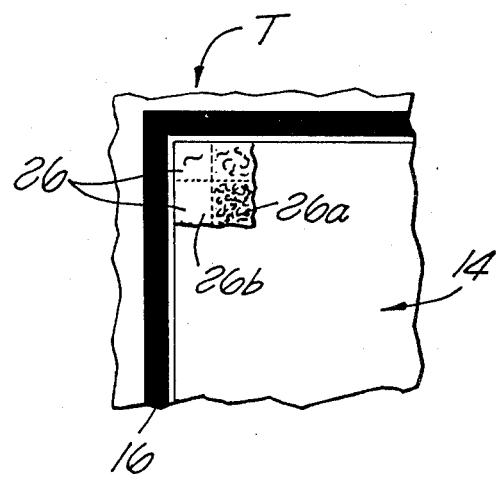
FIG. 3 is an enlarged fragmentary view of the tag of FIG. 1 illustrating the measurable but not practicably duplicable variation in its physical characteristic.

In sensing the tag T, only predetermined specific small areas are of interest. Locating such areas involves first locating the space 14, defining the field of locations therein, then finding the specific locations of interest. The corner indicia 16 locates the space 14 and is shown substantially enlarged in FIG. 3. Just inside the corner of the indicia 16, areas 26 are represented to suggest the varying translucency of the paper in the tag T. Specifically, the area 26a is represented to contain a considerable quantity of somewhat opaque fiber with the consequence that it would produce a low numerical indication of translucency, e.g. perhaps "one" or "two" on a scale of "zero" through "nine". On the contrary, the area 26b is indicated to be relatively clear of light-obstructing fibers or particles and as a consequence would be relatively translucent, perhaps producing a representative value of "eight" or "nine". The values produced from the other defined areas in the space 14 would lie in the range of these extremes.

As indicated above, the small-area translucency characteristic is measurable but not duplicable in a commercially practicable way, as a result of its small and complex pattern form. Generally, the measurable but not duplicable pattern will also be characterized as being random. As indicated above, the random character occurs in the growth, development or manufacture of the medium and is not simply random data imposed on the medium. With respect to the illustrative example of light translucency, the phenomenon occurs commonly in fibrous material, as in bond paper. Various phenomena (other than translucency) may be observed, as for example reflectivity or other characteristics that will modulate energy for sensing in the form of an electrical signal.

Figure 4:
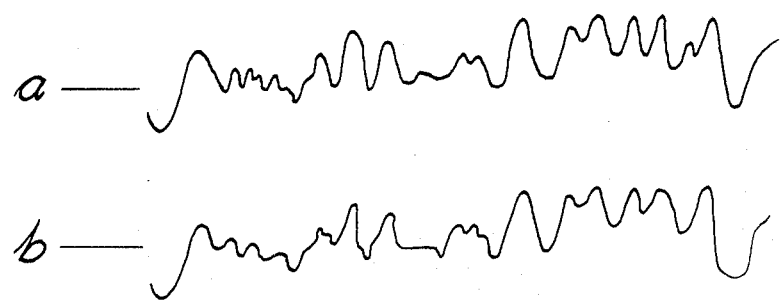
FIG. 4 is a graphic presentation illustrating signals modulated to represent variations in a measurable but not practicably duplicable characteristic.

One technique for sensing the areas 26 of the tag T involves scanning a line or row of the areas 26 continuously to produce an analog signal that can then be sampled at periodic intervals. Specifically, for one heavy paper, a scansion of translucency along a row of the areas 26 resulted in an analog signal as represented in FIG. 4a. Subsequently, another scansion taken along the same row of areas 26 resulted in an analog signal as illustrated in FIG. 4b. Thus, it may be seen that the values are repeatable so that a record of the curve of FIG. 4a may be checked with the curve of FIG. 4b (recently sensed) to verify the identification of the medium. As suggested above, the actual comparison may involve digitized samples of the signals at discrete intervals. Detailed forms of such comparison means are disclosed below.

Returning to pursue the explanation of the tag T (FIG. 1) reference will now be made to FIG. 5 to consider the field of locations defined for selecting specific locations or areas of the space 14. Within the space 14, a field or array 28 of squares 29 is to be specified in relation to the corner indicia 16. Specific areas then are selected in the array 28. The specific areas within the array 28 could also be of non-square shape, such as rectangular, circular, or other suitable geometry.

Figure 5:
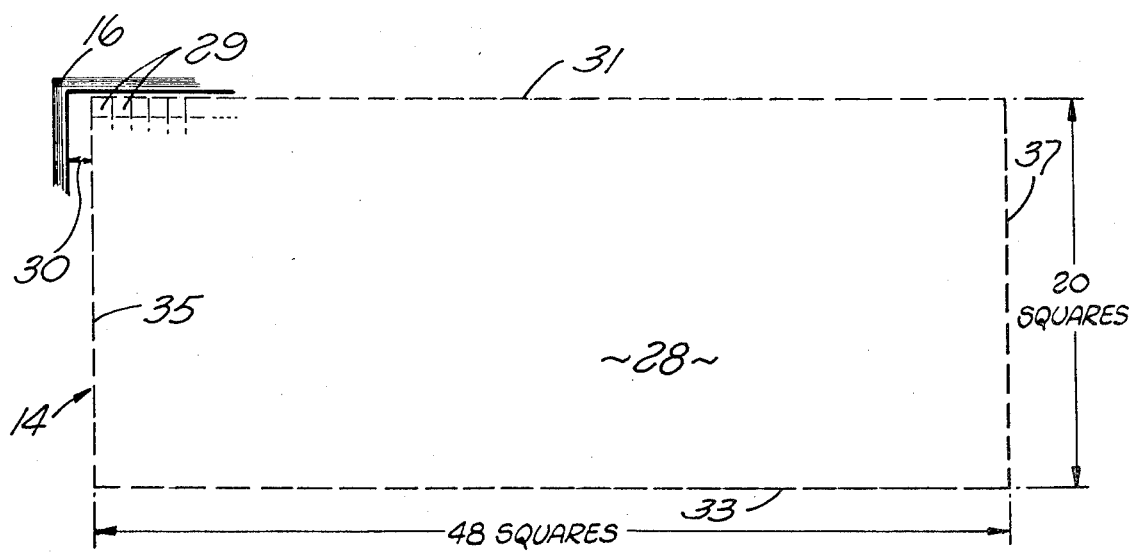
FIG. 5 is a diagrammatic view illustrative of an array or a field-of-locations format for the tag of FIG. 1.

As represented in FIG. 5, the location of the array 28 is displaced from the corner indicia 16 by an offset distance (varying for different authenticators) indicated by a line 30. The location of the array 28 in relation to the corner indicia 16 is specified by one decimal digit of the reference number 10.

The array 28 defines a matrix or grid of nine hundred and sixty of the individual squares 29. Specifically, the array 28 (FIG. 5) is twenty squares from top 31 to bottom 33 and forty-eight squares from left edge 35 to right edge 37. Consequently, the grid contains nine hundred and sixty squares 29 which are numerically designated square "000" to square "959". Again, it is to be understood that neither the array 28 nor the individual squares are visually indicated on the tag T in any manner. Rather, their format and their precise locations are defined in relation to the indicia 16 by the reference number 10 and the operating format of the system. Essentially, time and motion relationships are used to locate the spaces.

Considering the format of the squares 29 within the array 28 in greater detail, the array 28 is divided into eight separate rectangular sectors as graphically illustrated in FIG. 6. Specifically, the sectors A, B, C, D, A', B', C', and D' occupy the array 28 in a rectangular pattern, and each sector contains one hundred and twenty of the squares 29 (FIG. 5). The squares within each of the sectors (FIG. 6) are also in a rectangular pattern and are designated as follows:

| Sector | Squares 29 |
|---|---|
| A | 000–119 |
| B | 120–239 |
| C | 240–359 |
| D | 360–479 |
| A' | 600–719 |
| B' | 480–599 |
| C' | 840–959 |
| D' | 720–839 |

According to a disclosed format, the code or reference identification for each tag T is derived from the array 28 (FIG. 5) by selecting one square from each of six of the sectors A, B, C, D, A', B', C', or D' (FIG. 6). The measurable but not duplicable characteristic observed in the physical medium of the tag T at each of the selected squares 29 (FIG. 5) provides a representative signal on a scale from zero to nine. In the embodiment as disclosed in detail below, six such representative signals are developed as a characteristic code to identify the tag T. With such a characteristic code, test apparatus can verify the tag. In one disclosed embodiment, as will now be considered in detail, the six decimal digits of the characteristic code are embodied in the decimal reference number 10 (FIG. 1) which is printed on the tag T. The specific data format of the printed reference number is as follows:

| Data | Decimal Digits | Name | Function |
|---|---|---|---|
| shift digit | 1 | word SD | indicates length of offset line 30 to locate array 28, FIG. 5 |
| address | 9 | word AN | identifies selected pattern of squares 29 in array 28 |
| characteristic code | 6 | word CC | represents translucency of selected squares 29 |
| identification data - optional | 10 | word IW | carries miscellaneous data as date, etc. |

The reference number 10 (FIG. 1) in a format in accordance with the above table is used in a signal represented form, identified as a code word PN. It is to be appreciated that the first sixteen digits (decoded word DW including words SD, AN, and CC above) are cryptographically coded into a code word designated CW. Consequently, the code word CW may not identify directly with the digits of the decoded word DW, although the data of each include: one digit indicative of the offset or location of the array 28, nine digits which indicate the six predetermined locations or addresses of the selected squares in the array pattern, and six digits indicative of the translucency at the selected squares.

The coded word CW (sixteen digits) is supplemented by an additional ten digits (word IW) to complete the data of the code word PN. For ease of explanation, decimal digits will be used in the following explanations, recognizing that implementations may be in a form of binary-coded decimal or pure binary codes.

Recapitulating to some extent, the code word PN is developed on the basis of randomly selected location data and measurements of the tag T. The selected data measures the offset of the array 28 (FIG. 5) and the locations of the specific squares 29 therein that are to be used to specify the characteristic. The measurements of those squares 29 provide six additional digits (word CC).

The word PN is completed with miscellaneous data as indicated above and reduced to the form of the reference number 10 which is printed on the authenticator tag T. The tag T is then available for authentication to verify the likelihood that an associated product is genuine without reference to other memory. Thus, it is not necessary in this implementation to store inventories of tag characteristic data separate from the tags themselves.

In the authentication or test operation, the authentication system of this embodiment cryptographically decodes a portion of number 10 (code word CW) to provide the decoded word DW. That word indicates: the precise location of the observed pattern of squares 29 in the array 28 (FIG. 5) and the digits indicative of the previously observed value of the physical characteristic at each of such individual squares.

After determining the location pattern of the select squares 29, the system senses the physical characteristic values of the squares in the form of decimal digits (code word CC') which are then compared with the originally sensed data word CC, six decimal digits. As disclosed in detail below, the comparisons are performed in a manner to allow some tolerance for situations in which the tag T may have been damaged or changed with age. Also, various other techniques can be used in that regard, as to set a scale based on a current measurement or observation.

In the event that a tag T is fraudulently duplicated simply by mechanical copying, statistical considerations indicate that the characteristic code word CC (contained in the reference word PN) will not even approximate the code word CC' sensed as the characteristic of the tag T, e.g. the translucency of several predetermined squares on the tag T. Consequently, the counterfeit is detected.

The format employed in the embodiment under consideration for specifying certain of the squares 29 will now be considered. Although the format coding may appear to be quite unusual, as will become apparent, the format may enable verification of an authenticator, even though it has been damaged.

As indicated above, the array 28 (FIG. 5) is divided into eight sectors (FIG. 6), each of which is in turn subdivided into one hundred twenty squares 29. Also as indicated above, the system encodes the authenticator tag T by sensing six predetermined squares 29 from the array 28 of nine hundred and sixty squares. Those six select squares 29 provide six decimal digits. Note that the six decimal digits are taken from six different sectors and are addressed by nine decimal digits. Such addressing is accomplished by obtaining (randomly or selectively) the addresses for three squares (nine decimal digits) in the sectors A, B, C, or D then mathematically deriving related addresses for the sectors A', B', C', or D'. Thus, in case of damage to an authenticator, addresses often can be derived from remaining valid data.

The sector A contains a uniform sub-array (ten by twelve) of one hundred and twenty of the squares 29 designated or addressed by the numerals 000 through 119. Consequently, a three-digit decimal number from 000 through 119 (inclusive) designates specific square in sector A. By incrementing the address by 600 the same numerical address also designates a particular square in sector A' (sequence 600–719). As a specific example, the number 075 designates a specific square in the sector A and as a related value, the number 675 designates a square in sector A'.

Just as squares specified in sector A are incremented by 600 to specify squares in sector A', similar addressing is used for the other sectors. Square designations in sector B are incremented by 360 to obtain an address for designating a square in sector B'. Addresses designating squares in sector C are incremented by 600 to designate squares in sector C'. Finally, addresses for squares in sector D are incremented by 360 to be translated into addresses for squares in the sector D'. Using such a format, an address word of nine decimal digits indicates six squares in the array 28. Thus, nine decimal digits indicate three squares in three of the four sectors A, B, C, or D and three squares similarly in three of the four sectors A', B', C', or D'.

Continuing with the explanation of the format in the array 28 (FIG. 5) of squares 29, the division or partitioning as suggested above is regular and uniform. That is, the squares 29 in each sector lie in a rectangular array of rows and columns. Specifically, for example, the right-most column (vertical) of sector A (FIG. 6) contains squares addressed by the numerals zero through nine. Such a format is used to subdivide each of the sectors of the array 28. As will be explained in greater detail below, the array 28 is sensed or observed by a bank of twenty miniature photoelectric cells which are aligned with the coinciding rows in pairs of side-by-side sectors. Thus, for example, the squares 29 of the sectors A and B are read together as the bank of cells relatively scans across the space 28. If using an authenticator made of standard data processing card stock, squares of one-tenth of an inch are effective with a tolerance to fifteen thousandths of an inch.

As each square in the array 28 (FIG. 5) is observed or sensed, its translucency results in an analog value which is quantized into one of ten discrete levels, i.e. zero through nine. From such data, six digits are developed from six selected squares that are identified herein both in the form of a numercial value and a signal by the designations U, V, W, X, Y, and Z. These and other signals and data designations used in relation to the present embodiment are summarized for convenient reference in the following alphabetical list:

| Designation | Description | Decimal Digits (or Binary) |
|---|---|---|
| AN | Address word portion of DW | 9 |
| AU | Authentication signal | binary |
| C | Clock signal | binary |
| CC | Characteristic code word (recorded) | 6 |
| CC' | Characteristic code word (sensed) | 6 |
| CN | Code number portion of DW | 6 |
| CW | Coded word portion of code word PN | 16 |
| DW | Decoded form of CW | 16 |
| IW | Identification word portion of word PN | 10 |
| PN | Code word (reference number on authenticator) | 26 |
| SD | Shift digit of DW | 1 |
| ta | Timing signal | binary |
| tb | Timing signal | binary |
| tc | Timing signal | binary |
| td | Timing signal | binary |
| t1 | Time signal - read PN | binary |
| t2 | Time signal - decode CW | binary |
| t3 | Time signal - position authenticator array | binary |
| t4 | Time signal - read array for CC | binary |
| t5 | Time signal - compile | binary |
| t6 | Time signal - compare CC values | binary |
| t7 | Time signal - display | binary |
| U | Decimal digit of CC or CC' | 1 |
| V | Decimal digit of CC or CC' | 1 |
| W | Decimal digit of CC or CC' | 1 |
| X | Decimal digit of CC or CC' | 1 |
| Y | Decimal digit of CC or CC' | 1 |
| Z | Decimal digit of CC or CC' | 1 |

In view of the above introductory explanations, the structural aspects of the initial detailed embodiment can now be pursued effectively in greater detail. First, explanation will be of an apparatus (FIG. 7) for generating the reference numbers, e.g. identification number 10 which equates to the code number PN (encoding). Next, an embodiment is considered with reference to FIG. 8 for explaining an operation of verifying an authenticator (decoding) and testing. Thereafter, other systems are treated, explaining various components and operating aspects in substantially greater detail.

Referring to FIG. 7, a random code generator 50 provides code words which are screened or verified as specifying appropriate offset and address. The code generator 50 provides signals representative of the nine-digit word AN to a register 52 along with a single digit SD, indicative of the offset of the array 28 from the corner indicia 16 (FIG. 5). This operation occurs during a period indicated by a timing signal ta as represented in FIG. 7. Note that the binary timing signal ta, along with similar subsequent timing signals tb and tc can be provided by various digital structures, as a counter. Also, the representative number of decimal digits for registers in the system of FIG. 7 are indicated in parentheses at each register.

During an interval after registering the word AN, the timing signal tb sees the offset digit SD applied to an MBND (measurable but not practicably duplicable) physical characteristic sensor 54 along with the address word AN. During that time, the sensor 54 receives an authenticator, e.g. tag T, and under the command of the representative signals SD and AN locates six squares 29 on the tag T at which translucency is sensed to provide the six-digit characteristic code word CC. It is to be noted that as indicated above, an alternative to selective sensing would be to sense or read the entire array 28 to provide an analog signal, then selectively gate portions of that signal as related by time and space to the select six squares 29.

Continuing with the present example, the digits of the code word CC (representing degrees of translucency at the six selected squares 29) are represented by six decimal digits designated U, V, W, X, Y, and Z. These digits along with the offset digit SD and the address word AN are placed in a register 56 during the interval of the timing signal tc.

A variety of cryptographic encoders are well known in the prior art and may be employed in embodiments of the present invention. As illustrated in FIG. 7, a form of cryptographic encoder 58 receives the contents of the register 56 (sixteen digits of the word DW) for cryptographic encoding to provide the coded word CW for the printed reference number 10. The digit of the word CW are supplied to a register 60 which also receives the miscellaneous data portion or code word IW from a register 62. In that fashion, the register 60 receives the reference number PN which, in one operating format, is imprinted on the tag T (FIG. 1).

The register 60 may incorporate a readout device for providing the reference number 10 (representative of word PN). Alternatively, the signals representative of the number may be employed to drive any of a variety of printing mechanisms to imprint the identification number on the tag authenticators T. If desired, as indicated above, the identification number may also be placed on the article or product for sale (number 12, FIG. 1).

In an another arrangement, the PN register 60 may be connected to a magnetic recorder 64 for recording the number PN on the authenticator it identifies, the authenticator incorporating a magnetic recording surface as disclosed in detail below. A system of continuous operation for producing complete authenticators also is described below.

After an authenticator, e.g. tag T (FIG. 1) is associated with an article, e.g. the shoe S, in due course the occasion may arise to verify the authenticity. In general, verification is performed by reading the number 10 (word PN) and decoding it to obtain: (1) the locations of squares 29 in the space 14 which are to be sensed (word AN) and (2) the values of the characteristic expected to be sensed at the indicated squares (word CC). With such information, the array 28 is defined (FIG. 5) then the identified squares (FIG. 6) are sensed. The resulting fresh numerical observations (word CC') then are compared with the similar previous recorded observations (word CC) to confirm authenticity.

Assuming an exemplary operation of the disclosed embodiment to validate a tag T, reference will now be made to FIG. 8 for an explanation. The tag T (FIG. 1) is placed in an authenticator holder 66 which is associated with a numerical input device 68 and a sensor 70. The device 68 inputs the reference number 10 (FIG. 1—twenty-five digits) providing representative electrical signals for that number. In a specific embodiment of the system, the device 68 may comprise any of a wide variety of structures ranging from a manual key-operated apparatus to a numerical optical reader. If the reference number 10 is in the form of a bar code, the device 68 may be a wand or other type of bar-code scanning device, such as those employing laser scanning, as known in the art. In using an authenticator as described in detail below to include a magnetic recording surface, the input device 68 includes a magnetic stripe reader. In any event, the device 68 functions during an interval designated by an initial binary timing signal ta to load a register 72 with a code word PN representative of the number 10 (FIG. 1).

Signal representations from the register 72 (comprising the code word CW) are applied to a cryptographic decoder 74 which functions during an interval of a timing signal tb to develop the decoded word DW, signal representations for which are placed in a register 76 during the interval of the timing signal tc.

Recapitulating, the sixteen digits of the word DW are allocated as follows: the first digit SD designates the offset (line 30, FIG. 5); the following nine digits, designated word AN, specify the addresses of the squares 29 to be sensed; and the last six digits, word CC, specify the characteristic code and comprise the digits U, V, W, X, Y, and Z.

During a time interval defined by a signal td, the sensor 70 receives signals representative of the digit SD along with the signal represented word AN. As described above, the signals specify six squares 29 of the authenticator. At such locations, the tag T is sensed to provide signals representative of six decimal digits U', V', W', X', Y', and Z' as indicated above. The signals representative of such digits (word CC') are supplied from the sensor 70 to a comparator 78 which also receives signals representative of the corresponding digits U, V, W, X, Y, and Z (word CC) from the register 76. That is, during the interval of the signal td, the comparator 78 receives the code word CC which was carried in the identification number PN, concurrently with the freshly sensed code word CC'.

The comparator 78 provides signals to indicate the degree of coincidence between those two code words. Specifically, the comparator 78 supplies a signal to a display apparatus 80 which may indicate any one of the numerals: "0", "1", "2", and "3". Exhibition of the numeral "0" indicates no significant degree of comparison thereby designating the tag T as a fraud. Display of the numeral "1" indicates a small degree of coincidence, e.g. two of the six digits may compare. In a related fashion, the display of numeral "2" indicates a greater degree of comparison, and the numeral "3" indicates full coincidence. Thus, the observer is afforded with an indication of the degree of coincidence; and in that regard, some latitude may be tolerable or desirable as part of an acceptable authentication. As indicated above, the display 80 may also manifest various data as the product batch number or even a specific product number. In that manner, the system of the present invention is useful in detecting diversion of products as well as the counterfeiting of products.

From the above description, it may be seen that the system of the present invention affords an authenticator that cannot be production copied in a commercially practical device. The cryptographic code may range from being a relatively simple one, requiring only manual decoding, to a complex one requiring computer decoding with a randomly generated computer key stored in the computer, and unknown to any living person.

Considering various degrees of comparison which may be sensed as disclosed in the system of FIG. 8, the material of the authenticator and its environment may permit use to a standard of complete coincidence. However, with regard to other products, considerable tolerance may be advisable to allow for damage to a portion of the authenticator. In that regard, tests on various fibrous materials including paper tag or label stock indicate a wide variety of media that meet the requirement of being repeatably scannable, preservable, and unique with regard to the translucency patterns discussed above.

Using the authenticator format as disclosed with reference to FIGS. 5 and 6, it is noteworthy that a three-digit comparison may be accomplished by using either half of the tag. That is, as the digits U, V, and W are derived from three of the four sectors A, B, C, or D and the digits X, Y, and Z are derived from three of the four sectors A', B', C', and D', one set of three values may be obtained upon ignoring either half of the authenticator as shown in FIG. 6. If the lower half of the array 28 is ignored, the sectors A', B, C', and D remain intact. If the right half of the array 28 should be lost, the sectors A, B, C, and D remain intact; and so on. Such a philosophy is incorporated in the embodiment of FIG. 9 which processes authenticators having a format as described above. In describing the system of FIG. 9, reference is made to data formulated of decimal digits for ease of explanation and comprehension. However, it is to be understood that in accordance with widespread practice, such data may well be reduced to a binary-decimal format or operation might well utilize a purely binary system of values.

Figure 9:
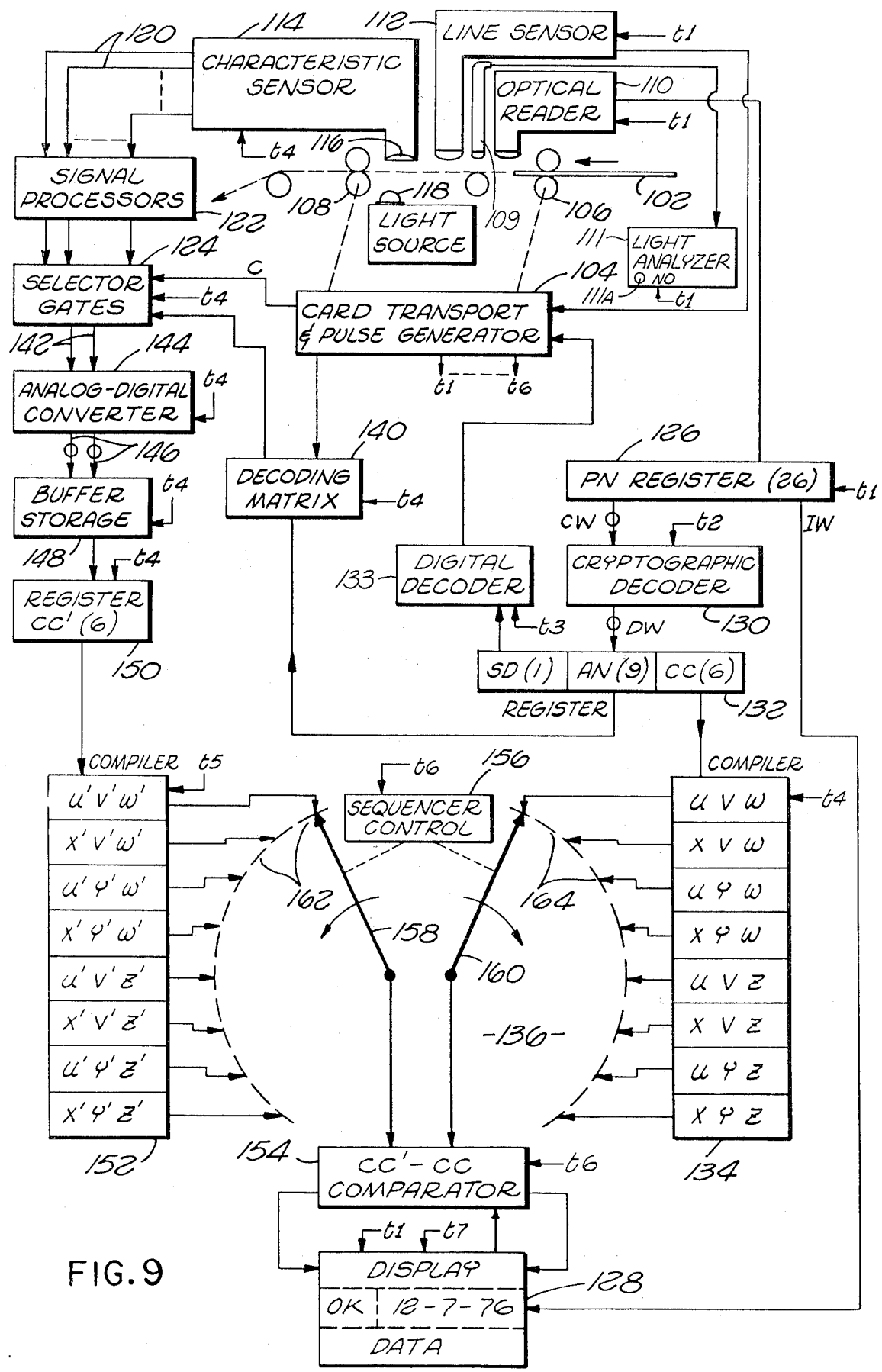
FIG. 9 is a schematic diagram of an authentication system illustrated in substantial detail.

The system of FIG. 9 is illustrated for use with an authenticator 102 (upper right) in the form of a tag or card as described above. The authenticator 102 is sensed or scanned while it is moved by a mechanical apparatus incorporated in a transport and pulse generator 104. Specifically, the generator 104 is connected as illustrated to roller pairs 106 and 108 which move the authenticator 102 from right to left in relation to devices for dynamic sensing. Traveling from the roller pair 106 through the roller pair 108, the authenticator 102 passes through four sensors or readers. Specifically, the authenticator 102 first passes under an optical reader 110 which senses the reference number 10 from the authenticator in the form of the word PN comprising twenty-six decimal digits. With the sensing of the number 10, the authenticator moves under a sensor 109 for a light analyzer 111. The analyzer tests the authenticator 102 spectrographically, to indicate material foreign to that of which the authenticators are made.

Next, the authenticator moves under a line sensor 112 that detects the corner indicia 16 (FIG. 1). The line sensor 112 senses the point from which clock pulses are counted for determining the offset. The authenticator 102 is then moved under the characteristic translucency sensor 114 for scanning. It is to be noted that zero offset could always be used, as in a continuous motion system of operation.

As suggested above, the characteristic sensor 114 incorporates a bank 116 of miniature photoelectric cells that are illuminated by an opposed light source 118. It is perhaps noteworthy that tests with various media indicate that in certain instances it may be desirable to use colored light (narrow spectrum bands). Specifically, blue light was found to be very effective for sensing the translucency of certain card stocks. Furthermore, the translucency of some card stocks or paper media may vary in spectral response to the point that colored light may be used to invoke another test element. That is, for example, a record of translucency measurements at one or more specified locations, using two or more different light sources for each location can provide another criterion in the verification of the authenticator.

As the authenticator 102 passes between the bank 116 and the light source 118, it is scanned along twenty parallel rows, to provide twenty signals, each of which is representative of the translucency (perhaps with regard to light of a specific color) of a row of squares defined on the authenticator 102.

The characteristic sensor 114 provides the analog translucency signals to output lines 120 which are connected to signal processors 122 for amplifying and refining the individual analog signals before application to a series of selector gates 124. Functionally, the gates 124 pass discrete samples of the observed analog signals which are representative of the selected squares 29 defined on the authenticator 102. The gates 124 are controlled by address information and clock signals C as described in greater detail below. However, it should be noted that the card transport and pulse generator 104 supplies timing signals and clock signals to the gates 124 indicative of the instant position of the authenticator 102 as it moves under the characteristic sensor 114.

To obtain the address data (AN and SD) signals are processed from the optical reader 110. Specifically, signals from the reader 110 representative of the code word PN (identification number 10) are first set in the register 126 for further processing.

One portion of the word PN, i.e. the cryptographically encoded word CW, comprises the first sixteen digits of the word PN. The remaining portion of the word PN (word IW consisting of ten digits) is not cryptographically encoded and simply indicates miscellaneous information or data, e.g. the date of encoding, an identification of the cryptographic encoding technique used, product information, and the like. Signals representative of the code word IW are supplied from the register 126 to a display unit 128 for direct display illustrated as "data" in FIG. 8.

The cryptographically encoded word CW is supplied from the register 126 to a cryptographic decoder 130. As a result, the sixteen coded digits are decoded to provide the code word DW which is then set in a register 132 (center right). The word DW consists of three parts, specifically: (1) the digit SD indicating the shift or offset of the array 28 from the corner indicia 16 (FIG. 1); (2) the address information word AN for locating the predetermined squares; and (3) the translucency data word CC for the translucency of the preselected squares.

The six-digit word CC is conveyed by signals from the register 132 to a compiler 134. In the compiler 134, the six individual digits of the reference word CC are compiled into the various possible combinations of three decimal digits. Specifically, the compiler 134 formulates the following combinations of the reference digits for comparison, the coincidence of any one of which with freshly sensed information affords an indication that the authenticator 102 is genuine; specifically:

U, V, W
X, V, W
U, Y, W
X, Y, W
U, V, Z
X, V, Z
U, Y, Z
X, Y, Z

Generally, as described in detail below, the individual combinations of digits as indicated above are represented for both the freshly sensed (data CC') and the record signals (data CC). These are applied to a sequencer system as generally designated by the numeral 136. Recall that the freshly sensed signals are shown primed to distinguish them from the corresponding recorded reference signals. The development of the freshly sensed signals for the word CC' will now be considered.

As indicated above, the analog signals, each representative of single scanning lines along a row of squares in the array 28 (FIG. 5) are supplied through the electrical lines 120 (FIG. 9, upper left) and the signal processors 122 to the selector gates 124. Two control signals (clock and gating) are provided to the gates 124 to pass selected samples of the analog signals during six discrete intervals. Such analog signal samples are selected by the address word AN and indicate the translucency of the six predetermined squares in the array 28 of the authenticator 102.

The address word AN is manifest by signals that are supplied from the register 132 (central right) to a decoding matrix 140 for the development of control signals that are in turn applied to the gates 124. The nine decimal digits of the word AN, include three, three-digit numbers to indicate directly three squares or addresses in three of the four sectors A, B, C, or D (FIG. 6). That is, the three, three-digit numbers of the word AN specify a specific row and column for each of the three locations as explained with reference to FIG. 6. Additionally, as explained above, the three numbers also specify specific rows and columns in the sectors A', B', C', or D'. Thus, the nine decimal digits are decoded to specify six squares or locations in the array 28 which are to be sensed for translucency.

Each of the selected squares 29 is selected on the basis of its row and column. The designation of a specific row designates a specific one of the lines 120. The designation of a specific column specifies a precise period of time during the read process (related to the position of the authenticator 102) which is a sampling interval indicated by timing or clocking signals provided from the transport and generator 104.

To consider an example, assume that a designated square in sector B (FIG. 6) lies in the fifth row and the sixth column (conventional orientation, counting down and right). As a consequence, an indication of the translucency value of the square would be contained in the analog signal of the fifth line in the series of lines 120. The specific sample or slice of that signal would occur when the sixth column is being scanned. Consequently, the selector gates 124 would be qualified by decoded gating signals from the matrix 140 and the generator 104 to pass a sample of the fifth line at the sixth scanning period which would indicate the translucency of the specified square.

In view of the possibility that two squares may be concurrently observed, two lines or conductors 142 are provided to carry such signals to an analogdigital converter 144. For example, samples could occur simultaneously from adjacent sectors.

The analog signal samples supplied to the converter 144 are translated into a digital format and supplied through cables 146 to a buffer storage unit 148. In that manner, the freshly sensed code word CC' is developed in a decimal digital format consisting of the digits U', V', W', X', Y', an Z'. Those digital signals are supplied from the unit 148 to a register 150 from which signals are supplied to a compiler 152 that is generally similar to the compiler 134. Consequently, the freshly observed translucency code word CC' is developed in the compiler 152 while the previously observed (and recorded) reference translucency code word CC is developed in the compiler 134.

The signals from the compilers 152 and 134 are sequenced for comparison through the sequencer 136 from which they are applied to a comparator 154. That is, the sequencer 136 incorporates a control 156 which advances a pair of contacts 158 and 160 to synchronously receive the developed composite values of U, V, W, X, Y, and Z. Although an electromechanical equivalent form of the sequencer system 136 is illustrated for simplicity, it is understood that the apparatus will normally be embodied in the form of solid state electronics as well known.

As the moving contacts 158 and 160 of the sequencer pass along the opposed pairs of stationary contacts in the sets 162 and 164, respectively, signals representative of similar combinations of U, V, W, X, Y, and Z are supplied in synchronism to the comparator 154. Of course, any of a variety of standards may be imposed; however, the occurrence of a single coincidence among the eight comparisons of composite values (depicted in FIG. 9) can generally be expected to indicate the authenticator 102 to be genuine. Operating on such a basis, the comparator 154 incorporates a flip-flop (not shown) which is set in the event of any identical comparisons. Subsequently, that flip-flop produces a signal to illuminate an indicator "OK" of the read-out unit 128. Other coincidences are redundant in such operation. As stated above, the display unit 128 also provides a date and other "data" relating to the authenticator 102.

In view of the above structural description of the system of FIG. 9, a complete understanding may now be perfected by explaining a sequence of operation from the time a card or authenticator 102 is placed in the system until a positive or negative indication is exhibited. Consequently, assume that the authenticator 102 is provided to the roller pair 106 with the result that the roller pair is automatically actuated and driven by the transport and generator 104 to advance the authenticator under the optical reader 110. At that instant, the transport and generator 104 is actuated to initiate a timing signal tl, which is one of a series to sequence the operation of the system.

The timing signal t1 is applied to the optical reader 110, the light analyzer 111 and the line sensor 112. As a result, the reference number 10 (FIG. 1) is read to provide signals indicative of the word PN which is registered in the PN register 126. Almost concurrently, the sensor 109 and the light analyzer 111 provides a spectrographic indication, sensing the character of the material of the authenticator 102. Of course, various degrees of sophistication can be employed in the analyzer 111. If the analyzer 111 determines that the material of the authenticator 102 is improper, a rejection lamp 111A is illuminated indicating negatively on the basis of the spectrographic test. Of course, various trace elements or compounds can be incorporated in the material of the authenticator 102 for simplifying this operation as related to the total system.

After the reference number 10 (FIG. 1) has been sensed, the authenticator 102 (FIG. 9) continues to move until the line sensor 112 detects that the corner indicia (FIG. 1) is critically positioned, i.e. in the preparatory position. At that instant, the transport and generator 104 stops the authenticator 102, terminating the initial operating interval designated by a high state for the timing signal t1 and initiating the interval of the timing signal t2.

Note that the optical reader 110, the light analyzer 111, the line sensor 112, and the register 126 are each operative during the interval of timing signal t1. After that time, the authenticator 102 is held in a preparatory position pending the time of the binary signal t2 being high, while the word PN is decoded by the decoder 130 to specify the offset as illustrated by the line 30 in FIG. 5. Also, part of the decoded word AN specifies the squares of interest with data which in turn selects the appropriate signal from the lines 120 and sampling times thereof to provide the correct translucency signals.

That portion of the word PN which is carried in the sixteen digits designated as word CW is processed by the cryptographic decoder 130 to produce the decoded word DW which is set in the register 132. A portion of that word, i.e. the digit SD, indicates the offset of line 30 (FIG. 5) and is applied through a digital decoder 133 to the transport and pulse generator 104. Essentially, the single decimal digit SD manifests the predetermined amount of offset. Accordingly, the digit SD is decoded and used by the transport and pulse generator 104 to advance the authenticator 102 a small distance, proportional to the numerical value of the digit SD.

Considering the extremes, a value of "nine" for the digit SD will cause the offset of line 30 (FIG. 4) to be the length of a square; however, a decimal digit SD with a value of "zero" will indicate no offset.

After sufficient time for the decoder 130 to operate, the timing signal t2 yields to the timing signal t3. Note that all of the timing signals are supplied from the generator 104; however, to preserve the drawing legible, connection lines are not shown.

The counting of clock pulses determines the initial offset to locate the point where reading begins and that initial operation occurs during the timing signal t3. At the conclusion of the timing signal t3, the authenticator 102 is aligned with the characteristic sensor 114 preparatory to the simultaneous or parallel scanning of the rows in the array 28 (FIG. 5). That operation is performed during the timing signal t4 and occurs as the authenticator 102 moves under the bank 116 of sensors. As a result, analog signals indicative of varying translucency along each of the rows of squares are provided through the lines 120 and the signal processors 122 to be selectively gated to pass six samples to the converter 144. From those analog samples the converter 144 provides six sets of decimal signals to the buffer storage 148 and then to the register 150. The timing interval of signal t4 then yields to signal t5.

During the interval of the timing signal t5, the compiler 152 manipulates the digital values as indicated in various combinations of U', V', W', X'Y', and Z'. At the conclusion of the interval indicated by the signal t5, the compilers 152 and 134 each contain a set of combination values. Note that the compiler 134 operates during the period of the timing signal t4.

During the interval of the timing signal t6, the sequencer 136 is operative to sequentially compare the individual combination values from the compilers 134 and 152. In the event of a coincidence at any stage of the comparison, the display 128 is commanded to indicate "OK" at the time of signal t7 manifesting the genuine nature of the authenticator 102. Of course, in the event that no comparison occurs, then the comparator 154 provides a negation signal indicating no authentication. The display 128 supplies a reset signal to the comparator during the interval of timing signal t7.

It should be understood that the final comparison of prerecorded and freshly sensed values may be done visually by the operator, rather than electronically as above described. Such visual comparison has the advantage of allowing the system some margin for error. For example, the operator could be instructed to consider a fresh reading within plus or minus one to be a match with a prerecorded value. For this reason, "comparator means" and the like phrases herein (including the claims) should be understood to embrace ordinary registers or displays associated with the authentication equipment, which can be visually observed by the operator.

Thus, it may be seen that systems in accordance with the present invention may be variously embodied to produce an authenticator then subsequently sense the authenticator on the basis of random, measurable but not duplicable physical media in order to verify the authenticator.

In an alternative implementation, deemed suitable for small production articles, the characteristic codes of authenticators may be registered in computer memory for test verification. Specifically, an authenticator (paper for example) could be measured or sensed to provide a characteristic code word for a product. The code word would then be placed on a list to be scanned for verifying an authenticator accompanying the product. Various other implementations will be apparent, including forms where part or all of the code word is carried with the product and can be obscured as disclosed in detail above, by cryptographic encoding. The pattern of predetermined squares may also be preserved in secrecy as disclosed in the above detailed embodiment. Of course, various forms of energy, record medium and so on may be employed in the system. In addition to paper, certain forms of card stock also have been found to be appropriate as being repeatably scannable, preservable and unique. As suggested above, spectral response variations may also be used for further assurance against counterfeits.

Figure 10:
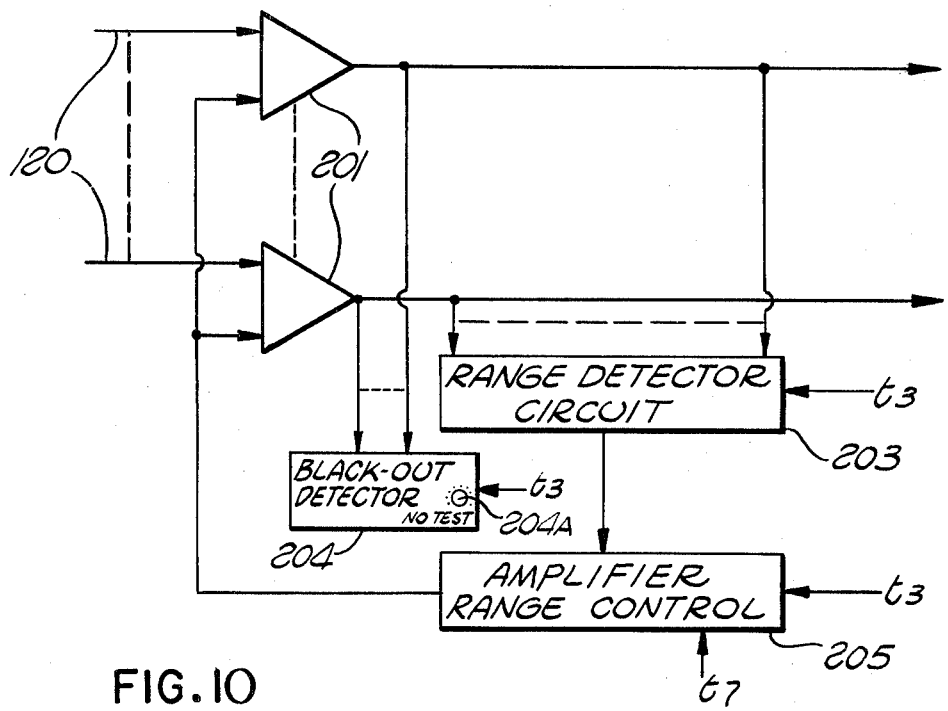
FIG. 10 is a block diagram of an exemplary form of a component in the system of FIG. 9.

Various techniques may be employed to accomplish a statistically satisfactory comparison between fresh and recorded data. In that regard, it may be desirable to pre-sense a tag to set a scale for sensed signals. As another technique, a sample of the sensed or observed values may be used as a standard which determines the range of other values. Such a technique might be employed in systems where the authenticator might change significantly but fairly uniformly with age or exposure to an anticipated environment. Also, in certain applications it may be appropriate to variously scale or stretch the observed signals depending upon the range of observed amplitude both in the encoding and decoding operations on the authenticator 102. For example, considering the decoding operation, if the signals detected by the characteristic sensor 114 are sensed in a narrow range, the signal processors may vary the operating range of the amplifiers (by stretching and clamping) so as to obtain a greater spread or range for the individual signals as well known in the art. In that manner, signal distinction and classification is accommodated. Of course, the range adjustment may be accomplished at a digital level as well as an analog level; however, for purposes of illustration, reference will now be made to FIG. 10 showing a structure which may be incorporated in the signal processors 122 (FIG. 9) to accomplish the variable amplification and to indicate a card that is unreadable. Such an unreadable authenticator might be an opaque counterfeit or a genuine card that has been smudged or otherwise ruined.

The ouput lines 120 (FIG. 9) from the characteristic sensor 114 are connected to signal processors 122 which as illustrated in FIG. 10 may include a plurality of individual amplifiers 201. As indicated, the output from each of the amplifiers 201 is applied to a black-out detector 204 and a range detector circuit 203. The detector 204 senses the occurrence of a substantial number of "black" or low level signal outputs indicating a departure from the format standard. The detector 203 provides an output range signal indicative of the extreme signals received from the amplifiers 201. Thus, fading or other changes in the authenticator are somewhat compensated, as well as equipment variations.

The range detector 203 may involve the operation of differential amplifiers to provide a signal which is applied to an amplifier range control circuit 205. Note that both the circuit 203 and the amplifier control 205 are timed to operate during the interval of t3 which affords a preliminary operating interval of the characteristic sensor 114 (FIG. 9) to sense a section of the authenticator that is in advance of the space 28 (FIG. 5). In essence, in this embodiment the authenticator 18 is observed to obtain an indication of the range of variations in translucency. Then, depending upon the observed range, the amplification of the representative signals is accommodated to a desired scale of amplification by the amplifiers 201 (FIG. 10).

The amplifier range control 205 supplies a signal to each of the amplifiers 201 to shift the scale of amplification. Essentially, the amplifiers 201 are nonlinearly responsive to the signal from the control 205, operating on different portions of an amplification curve to accommodate signal range. An example will illustrate the operation.

In the event that the spread or differential between signals received in the range detector circuit 203 is large, a relatively high signal level is applied to the amplifier range control 205 which consequently provides a relatively low control signal to each of the amplifiers 201 causing them to operate with relatively linear amplification. On the contrary, if the spread or differential manifest by the signals received in the range detector circuit 203 during the interval of the signal t3 is small, a relatively small output signal is provided from the circuit 203 to the control 205. As a result, a somewhat larger signal is applied from the control 205 to each of the amplifiers 201 causing the amplifiers to operate nonlinearly and thereby increasing the spread or range of the observed signals.

The amplifier range control circuit 205 is set during the interval of the signal t3 and maintains a predetermined control signal for the operation of the amplifiers 201 throughout a sensing operation. Thereafter, during the interval of the signal t7, the control 205 is cleared preparatory to a subsequent cycle of operation.

Also operating with the amplifiers 201, the black-out detector senses a situation in which a significant portion of the authenticator has minimal or essentially very low translucency. The situation could occur when an authenticator card is dirty or smudged, or as a result of tampering or with the use of a counterfeit card. In such an event, the very low levels of translucency will result in very low levels for the signals in the lines 120. The coincidence of a predetermined number of low-level signals in the lines 120 is sensed by the detector 204 to illuminate a lamp 204A. Such an event informs an operator that the test may be impossible because of various possibilities as indicated above. Specifically, the illumination of the lamp 204A informs the operator that a card should be carefully inspected in spite of indications by the system, e.g. the authenticator may be a counterfeit or may have been changed to be incapable of verification.

Figure 11:
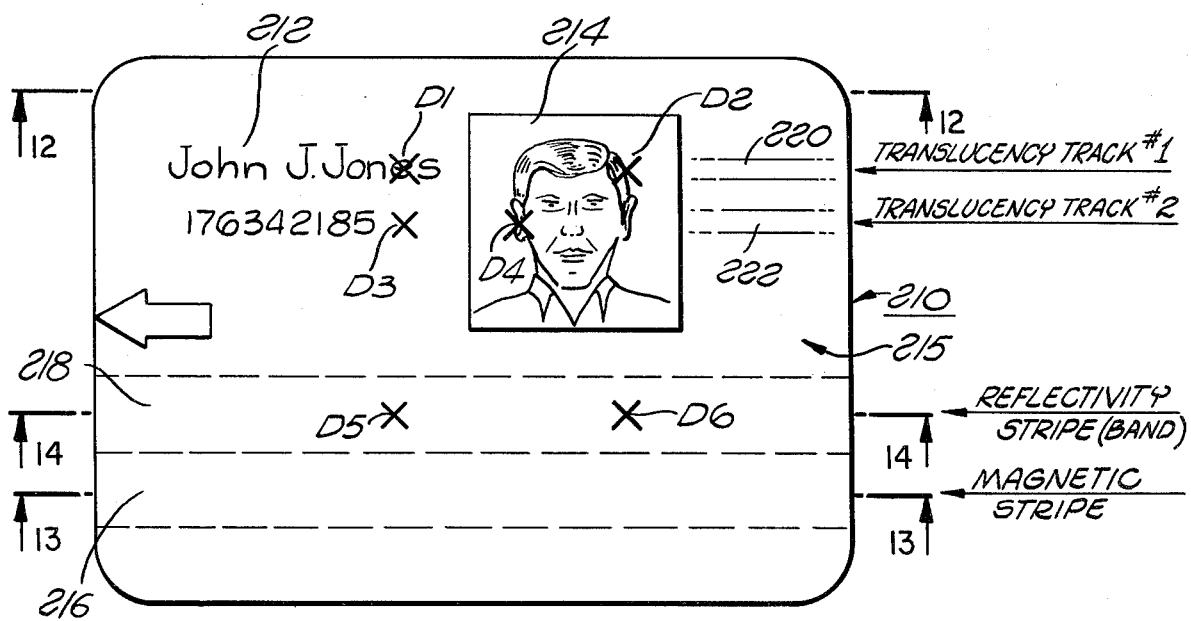
FIG. 11 is a plan view of an identification card of the present invention implemented for use in accordance with the present invention.

From the above, it will be apparent that the system of the present invention may be variously implemented to utilize a wide variety of different components and structures to accommodate the basic philosophy of operation wherein measurable but not practicably duplicable random variations in physical media are employed to verify authenticity. As an example of such alternatives, the system of the present invention can be effectively used to implement a reliable identification card as illustrated in FIG. 11 and which will now be considered in detail.

The card 210 is a laminate article incorporating a basic sheet, e.g. bond paper 215 (see FIGS. 11, 12 and 13), along with certain other media for verification indications.

Considering the format of the card 210 (FIG. 11), assume for example that it is adapted for use as a form of personal identification. Of course, certain of the aspects as disclosed herein may be readily adopted for use in a wide variety of documents including passports, valuable paper, authenticators, and so on.

Figure 12:
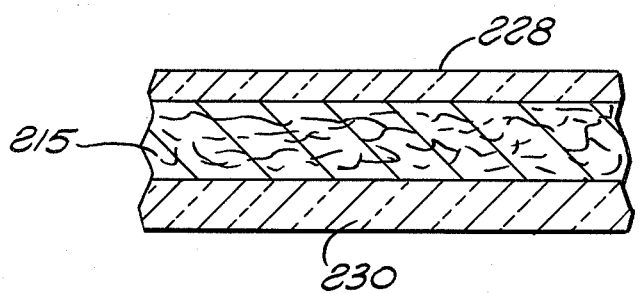
FIGS. 12, 13, and 14 are sectional views taken through the card of FIG. 11, respectively along lines 12—12, 13—13, and 14—14.
Figure 13:
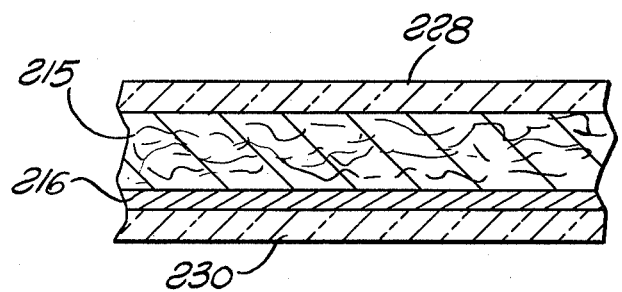

In the illustrative form, the card 210 carries print 212 (upper left) indicating the name of the assigned holder along with a photographic likeness 214 (right). The print 212 and the likeness 214 may be variously deposited or printed on a sheet of bond paper 215 (FIG. 12). Generally, the print 212 and the likeness 214 alter the translucency of the bond paper 215 in certain specific areas. In general, overlays, erasures or other modifications of the print 212 or the likeness 214 will tend to further alter the translucency of the paper 215 at points of alteration.

In general, in accordance herewith the translucency of predetermined areas involving the print 212 or the likeness 214 is sensed and provided as a record for authenticating the card 210. Sensing and recording operations may be as explained above. However, in an alternative arrangement, indications of the translucency (or various other random characteristics, measurable but not practically duplicable) are carried on the card in a form that is not generally humanly readable. Specifically, in the authenticator embodiment of FIG. 11, the verification confirmation information is recorded on a magnetic stripe 216 which may also provide various other information.

In the present embodiment, the magnetic stripe 216 incorporates a clock track which not only indexes another magnetic track of the stripe 216 but additionally indexes non-magnetic areas of the card 210 for critical characteristic observations. The characteristic observations include translucency. Additionally, the card 210 incorporates a stripe or band 218 for indicating still another characteristic. Specifically, the band 218 provides dimensional reflectivity variations as a characteristic imposing an exceedingly severe burden for any effort at duplication.

The card 210 might be carried by the assigned holder for identification. An initial confirmation of the holder could be made simply by comparing the likeness 214 on the card with the holder's physical appearance. Confirmation of the card 210 and the absence of modification would then be checked by an apparatus constructed in accordance with the present invention as described in detail below. Generally, checking is performed by scanning the card horizontally along several paths. Specifically, the card 210 is scanned for translucency readings along paths 220 and 222 (translucency tracks 1 and 2) for characteristic data indicative of the bond paper 215 in composite with the print 212 or the likeness 214. Additionally, the card 210 is scanned along the magnetic stripe 216 to obtain confirmatory data. The data from the magnetic stripe designates selected locations along the paths 220 and 222 for translucency observations. The data may also indicate the values of prior observations as well as personal identification data for a subject or holder and data on the extent or limits of use of the card.

Figure 14:
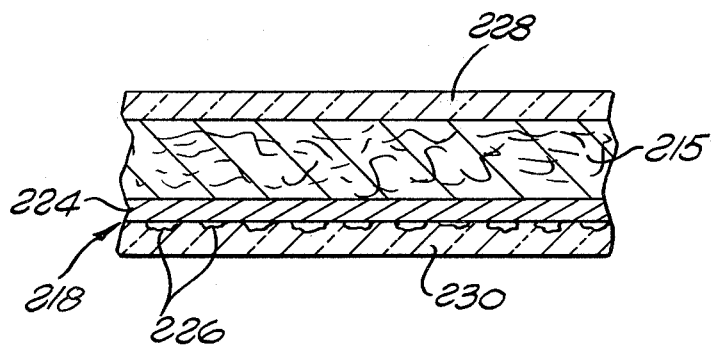

The structure of the card 210 includes means for a further confirmation of the authenticity, and is therefore adapted for exceedingly high reliability. Specifically, the card 210 incorporates a band 218 (reflectivity stripe) in the form of a layer of foil 224 (FIG. 14) carrying sand-like particles 226. The observed characteristic of the band 218 involves light reflectivity at particular locations. Data indicative of such characteristics are confirmed by apparatus somewhat similar to that employed for confirming the propriety of the translucency observation as mentioned above.

Considering the structural form of the card 210 in somewhat greater detail, the full area of the card is occupied by the bond paper 215 (FIGS. 11, 12 and 13) and a pair of external clear plastic sheet laminates 228 and 230.

In addition to sealing the bond sheet 215, the laminates 228 and 230 also enclose the magnetic stripe 216 and the reflectivity band 218. In general, techniques for the production of laminate identification cards incorporating stripes, e.g., magnetic stripes, are well known.

Turning now to the data format of the card 210 of FIG. 10, the magnetic stripe 215 involves two recording tracks as well known in the prior art. Of course, additional tracks (also as well known) may be incorporated in alternative embodiments. One of the magnetic recording tracks is a dedicated clock track while the other track carries the following data: the locations of select characteristic areas along the paths 220 and 222; location data for the reflectivity stripe or band 218; values of the characteristics at the specified locations; and the optional data including personal identification numbers, account numbers, use records, and so on.

To pursue a specific example of a card format, assume that data locations D1 and D2 (indicated by "X") are assigned in the translucency track 1 (path 220) and locations D3 and D4 (similarly indicated) are assigned in the translucency track 2 (path 222). Again, these locations are indicated by an "X" symbol on the drawing.

Further, assume that data locations D5 and D6 are assigned in the reflectivity band 218. Accordingly, the preliminary processing of the card would involve sensing the characteristic translucency at data locations D1, D2, D3, and D4 and the reflectivity at locations D5 and D6. Data indicating the locations (encoded if desired) along with the observed values of translucency and reflectivity is encoded on the magnetic stripe 216.

To verify a card, a preliminary visual observation might be made concerning the likeness 214 and the identification of the print 212. If such indicators appear satisfactory, machine verification may be pursued to indicate the possibility of either a counterfeit card or an altered card. Specifically, the measurable but not substantially duplicate characteristics at locations D1, D2, D3, D4, D5, and D6 are sensed and compared with the data registered from a prior sensing of such locations. If the card 210 has been modified (as in the likeness 214) or is a forgery, on a statistical basis, it is exceedingly unlikely that the comparative standard will be attained. For even further confirmation regarding the propriety of the card holder, a personal identification number test, may be incorporated in the magnetic stripe 216 as well known in the prior art.

Figure 15:
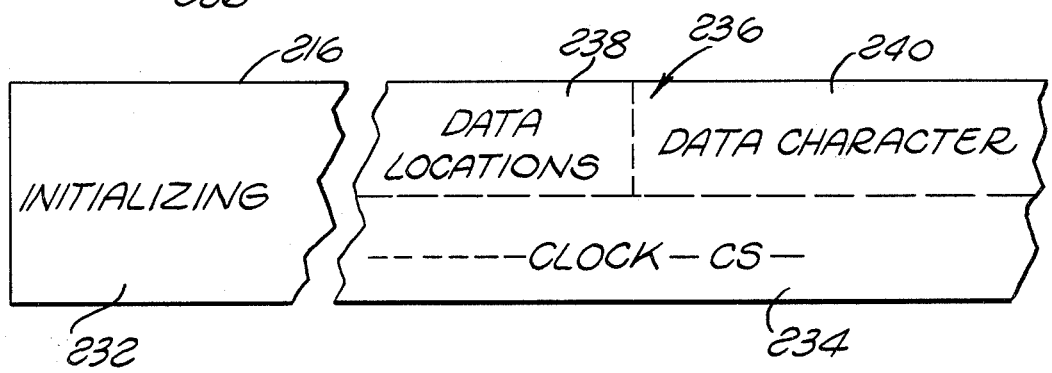
FIG. 15 is a fragmentary diagrammatic view of a recording format on the card of FIG. 11.

Prior to considering the system for processing the illustrative card 210, a preliminary consideration of the recording format on the magnetic stripe 216 will be helpful. Reference now will be to FIG. 15. The initial portion of the magnetic stripe 216 is dedicated to initializing the operation in cooperation with a magnetic card reader. Accordingly, an initializing section 232 occupies the leading edge of the stripe (left as illustrated). Beyond the initializing section 232, the lower portion of the stripe 216 records clock signals CS in a track 234 while the upper portion records data in a track 236.

In the described embodiment, the first section 238 of the data track 236 specifies the data locations D1-D6 of interest for the card. Following the section 238 (left to right) in the data track 236 is a section 240 for recording the data characters, i.e. the characteristics sensed at the locations D1-D6. In the operation of the system, the data in the magentic location 238 and the clock track 234 locate the points or locations D1-D6 for sensing. The characteristics observed at such points or locations on the card 210 are then compared with recorded data characters provided from the section 240 which were recorded at the time of the initial sensing. Of course, on any selected basis of criteria, as explained above, the comparison will either indicate the card's authenticity a failure of confirmation. Consideration will now be directed to the structure of FIG. 16 which performs the test as generally indicated above. A card reader 250 (top left) may take any of a variety of forms for sensing the data as described above from the card 210 (FIG. 11). Specifically, the card reader 250 incorporates: (1) apparatus for sensing translucency along the paths 220 and 222, (2) structure for reading the magnetic stripe 218 as well known in the prior art, (3) apparatus for sensing reflectivity along the band 218, and (4) an analog-to-digital converter to convert observed analog translucency and reflectivity readings to a digital format. A form of reflectivity sensing apparatus is disclosed in detail below. The card 210 may be automatically moved through the card reader 250 as explained with regard to the authenticator 102 in the system depicted in FIG. 8. Alternatively, the card reader 250 may be a manually operated sensing device wherein a person simply pushes the card 210 through an elongate slot. A form of the latter device for sensing a magnetic stripe is disclosed in U.S. Pat. No. 3,914,789, Cocker, Jr. et. al.

The outputs from the card reader 250 include: signals D and CS representative of data and clock signals from the magnetic stripe 216 (carried on lines 252 and 254); data representative of the translucency along paths 220 and 222 (carried in lines 256 and 258); and a reflectivity signal sensed along the band 218 (carried in line 260).

The clock signals CS (line 254) are applied to a control unit 262 for developing refined clock signals C. The clock signals C are supplied to each of the functional components of the system; however, in the interest of simplification, connection lines are not illustrated.

Figure 16:
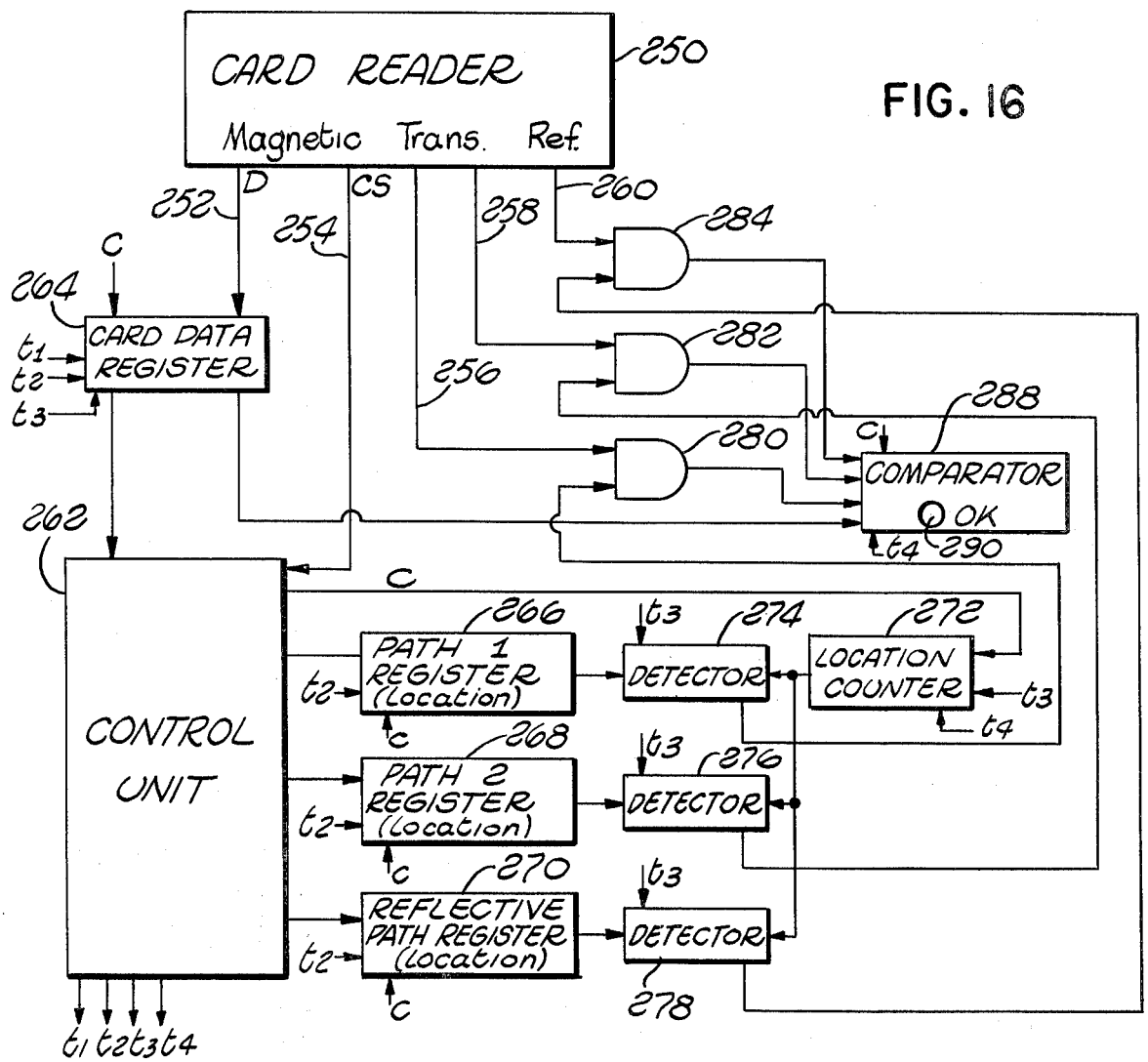
FIG. 16 is a block diagram of a system for utilizing the card of FIG. 11.

The operating sequence of the system of FIG. 16 is controlled and regulated by timing signals t1-t4 from the control unit 262 along with the clock signals C. The timing signals t1-t4 are developed by the control unit 262, using the clock signals C and the data signals D.

After the initializing operation, the binary timing signal t1 is applied to a card data register 264. Under the control of the signals t1 and C, the register 264 receives the record from the data track 236 (FIG. 15). Of course, the magnetic data stripe information may vary as suggested above; however, the portion thereof pertinent to the embodiment of FIG. 16 is utilized to specify the locations D1-D6 and the characteristic measurements at such locations. The data locations from the section 238 (FIG. 15) are specified by signals applied from the register 264 to the control unit 262 during timing signal t2.

Some decoding may be performed on the data location signals as disclosed above with regard to earlier embodiments; however, depending upon the format employed, any of a variety of specific signals may be supplied from the control unit 262 during the interval of binary timing signal t2, to specify the data locations D1-D6.

Signals representative of the locations D1 and D2 (for path 220) are provided from the control unit 262 to a register 266. Somewhat similarly, location signals for the recording path 222 are placed in a register 268 and location signals for the reflectivity band 218 are provided in a register 270. As a consequence, after the transfer during the interval of timing signal t2, the register 266 contains two values to indicate the locations D1 and D2 of the translucency track 1, i.e., path 220. Somewhat similarly, the register 268 contains values indicative of the locations D3 and D4 on the translucency track 2, i.e., path 222. Finally, the register 270 holds values representative of the locations D5 and D6 along the reflectivity band 218.

In essence, the values from the registers 266, 268, and 270 are tested against the accumulated values in a clock pulse counter 272 to indicate the instants when the locations D1-D6 are being sensed to thereby command selection of the current values detected from the sensing as the selected data characters.

The instant position of the card 210 (as it is sensed in the card reader 250) is manifest by a location counter 272 which receives clock pulses during the timing interval of the signal t3. Essentially, the tally or accumulated count in the counter 272 indicates the relative displacement of a card 210 in the card reader 250, thereby indicating the position of the sensing apparatus with respect to the locations D1-D6.

The accumulated count value from the location counter 272 is applied to digital coincidence detectors 274, 276, and 278 which also receive timing signals t3 and signal-represented values from the registers 266, 268, and 270. Upon detecting a coincidence between received sets of signals, each detector 274, 276, and 278 provides the high level of a binary output signal to qualify a gate indicating that a critical location (D1, D2, D3, D4, D5, or D6) is currently being sensed and the representative signal is to be gated for consideration.

Output signals from the detectors 274, 276, and 278 are connected respectively to "and" gates 280, 282, and 284. The "and" gates 280 and 282 receive the translucency signals in lines 256 and 258 respectively and are qualified at the critical point in time (space) to supply the observed values at the locations D1, D2, D3, and D4 (see FIG. 11). The "and" gate 284 receives the reflected signal value and is qualified at the instants for observation of locations D5 and D6.

The signals manifesting observations from the locations D1–D6 are supplied from the "and" gates 280, 282, and 284 to a comparator 288 which is also connected to receive signals from the register 264 representative of the data characters from section 240 (FIG. 15) of the magnetic stripe 218.

As described above, the comparator 288 receives six signal-represented values digitally representative of prior observations of the select characteristics at locations D1–D6 from the register 264. The comparator 288 also receives fresh data of the same nature from a current sensing of the card 210 through the gates 280, 282, and 284. The comparator 288 then compares the two sets of data (recorded and fresh) in accordance with a predetermined logic pattern and utilizes the comparison on a statistical basis for indicating the authenticity of the card in question as described in detail above. Of course, the authenticator 288 may utilize a variety of comparative techniques some of which have been explained above with respect to prior embodiments of the present invention. If a card 210 in question is resolved to be authentic or genuine, then a lamp 290 on the comparator is illuminated. Alternately, the comparing means may simply comprise two displays or registers with the operator then making a visual observation of the degree of coincidence between freshly sensed and prerecorded values.

To consider a specific examplary operation of the system of FIG. 15, assume the existence of a card 210 precisely as illustrated in FIG. 11 with the data locations D1–D6 sensed and appropriately recorded on the magnetic stripe 216 along with other specific data. Further assume that the card 210, so recorded, is presented for authentication by an apparatus constructed in accordance with FIG. 16. By way of example, assume the following relative characteristic values exist at the data locations:

| | |
|---|---|
| D1 | 3 |
| D2 | 7 |
| D3 | 2 |
| D4 | 5 |
| D5 | 1 |
| D6 | 6 |

With the movement of the assumed card 210 through the card reader 250, it is scanned from left to right (as illustrated) so that sensors pass over each of the horizontal sections of interest. At the outset of such scanning, the magnetic stripe 216 is sensed for an initializing operation in the control unit 262 as well known in the prior art for synchronizing the sensed clock signals CS with respect to the production of the timing clock signal C. After the brief initializing period, the clock pulses C are provided with space-related regularity throughout the balance of the card scanning operation.

After initializing, data is sensed by the card reader from the magnetic track 236 (Fig. 15). Specifically, values are provided from the first section 238 which specify the locations D1–D6 as by a numerical count of displacement along the card. Such data, along with the characteristic data from the track 236 is set in the card data register 264.

The control unit 262 receives the signal-represented data locations from the register 264, performs processing operations, and during the interval of the timing signal t2 sets the registers 266, 268, and 270 with two values each (in this example), which are independently supplied to the detectors 274, 276, and 278 during the interval of the timing signal t3. Specifically, the register 266 is set with values which are measured from a timing mark on the magnetic stripe 218 to initiate the interval of timing signal t3. Essentially, the data locations in the register 266 indicate the number of clock signals CS which lie in a horizontal path and offset the locations D1 and D2 from the starting or timing mark. Similar signal-represented values are set in the register 268 for the locations D3 and D4 as well as in the register 270 for the locations D5 and D6.

During the interval of operation (t3) the data values in each of the registers 266, 268, and 270 are continually compared with the incrementing number in the counter 272. That is, the counter 272 is actuated to count clock pulses C from the control unit 262 from the beginning of the timing signal t3. Thus, during the interval of the timing signal t3, the counter 272 specifies horizontal offsets for the locations D1–D6, which may be used according to the card format.

When the counter 272 attains a number equal to the horizontal offset for each of the locations D1–D6, one of the detectors 274, 276, or 278 signifies such an occurrence by qualifying one of the gates 280, 282, or 284 with the result that the observed analog signal (translucency or reflectivity sample) is gated to the comparator 288 perhaps to represent values of:

| | |
|---|---|
| D1 | 3 |
| D2 | 8 |
| D3 | 2 |
| D4 | 5 |
| D5 | 2 |
| D6 | 6 |

At the conclusion of the scanning of the card 210, currently sensed characteristic values (3, 8, 2, 5, 2, 6) from the locations D1–D6 are registered in the comparator 288. Also, the data from the magnetic stripe section 240 (D1–D6) are also registered in the comparator, i.e., 3, 7, 2, 5, 1, 6. During the interval t4, the two sets of data are compared for a degree of coincidence. Normally, any significant degree of coincidence between the freshly observed data and the previously observed data from the magnetic stripe will indicate that the card 210 is genuine and authentic. The small differences indicated in the exemplary data would likely be acceptable in most applications. However, in documents as the card 210, a higher degree of coincidence may be demanded to avoid acceptance of a modified document. In that regard, any change in the print 212 (FIG. 11) or the likeness 214 would likely be manifest by significant differences in the signals observed versus the signals recorded regarding the locations D1, D2, and D4.

While the above system selects the desired signals by direct gating, it will be apparent to those skilled in the art that an entire scanning of data could be sensed, sampled and converted as a basis for selective comparisons. Also, many different kinds of comparison techniques might well be employed, as for example amplitude ordering and mathematical manipulation and range comparisons, e.g., sum of squares comparisons.

Figure 17:
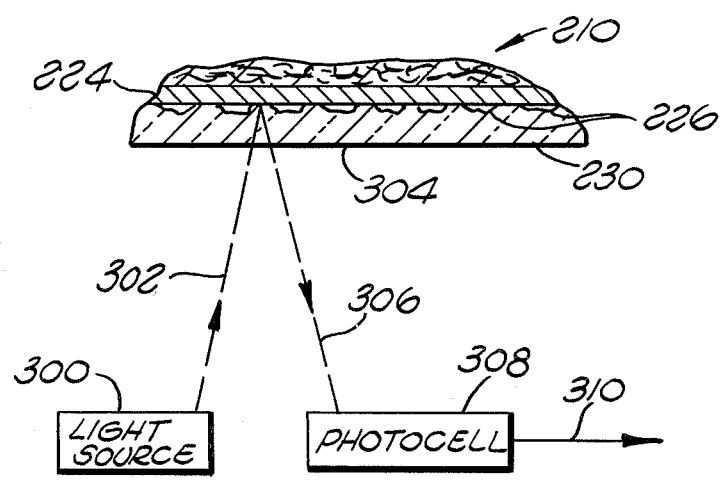
FIG. 17 is a diagrammatic view of a component of the system of FIG. 16.

The translucency sensing in the system of FIG. 16 may be as described with regard to an earlier embodiment. As for the reflectivity sensing, an exemplary structure is illustrated in FIG. 17. Specifically, the card 210 (illustrated fragmentarily) is moved transversely (to the right for example) in relation to a light source 300 which may, for example, comprise a low-power infrared laser to provide a beam 302 that is reflected from the card 210 as illustrated. A fragmentary or reflected beam 306 is detected by a photocell 308 which provides a representative analog signal in a conductor 310. Note that in the plane of the drawing of FIG. 17, i.e. the plane defined by the light source 300, the photocell 308 and the point of light incidence on the card 210 are at right angles to the motion of the card 210.

As the card 210 is effectively scanned by the beam 302, considerable variation is imparted to the beam 306 in view of the sand-like particles 226 which obscure the foil 224. As a consequence, a random measurable but not practicably duplicable characteristic is provided.

In a refined embodiment of the structure of FIG. 17 the illustrated system is duplicated for dimensional sensing operation. Specifically, a second transverse light source and photocell reflectivity reader are placed with interchanged positional relationship to the source 300 and cell 308. In that manner, a single path is scanned from two different dimensional viewpoints. Consequently, the dimensional path has a sensed characteristic that would be substantially immune from reproduction using any known photographic or other techniques. Other reflecting techniques, as backscattering may well be adopted for use in a system as disclosed herein.

As suggested above, certain random measurable but not practicably duplicable characteristics can be recorded at locations other than on the card 210 for example. To consider a specific case involving a low number of important cards, translucency signals from predetermined locations on each card 210 might be placed in memory quite separate and apart from the operations explained and described above. With such data, a questioned card could be further confirmed. Such a technique might be employed to combat unauthorized use of a proper card production facility.

In accordance herewith, a number of other measurable but not practicably duplicable characteristics may be useful as the random data source. In that regard, paper smoothness, as well as the smoothness of other materials may be practical in a commercial system. Specifically, in that regard, an apparatus is available from Measurex Corporation (Model 2205) which is a smoothness sensor adaptable for providing an electrical signal indicative of a smoothness along a specific line of travel.

From the above descriptions, it can be appreciated that authenticators in accordance herewith can be variously produced, used and verified. In that regard, authenticators in the form of tags bearing a magnetic stripe can be economically produced using roll stock techniques. Specifically, referring to FIG. 18, a reel 320 (left) supplies a roll 322 of card stock to a take-up reel 324 which is driven by a constant-speed motor 326. The roll 322 of card stock is perforated to define separate authenticators or tags 328, each bearing a magnetic recording stripe 330.

Figure 18:
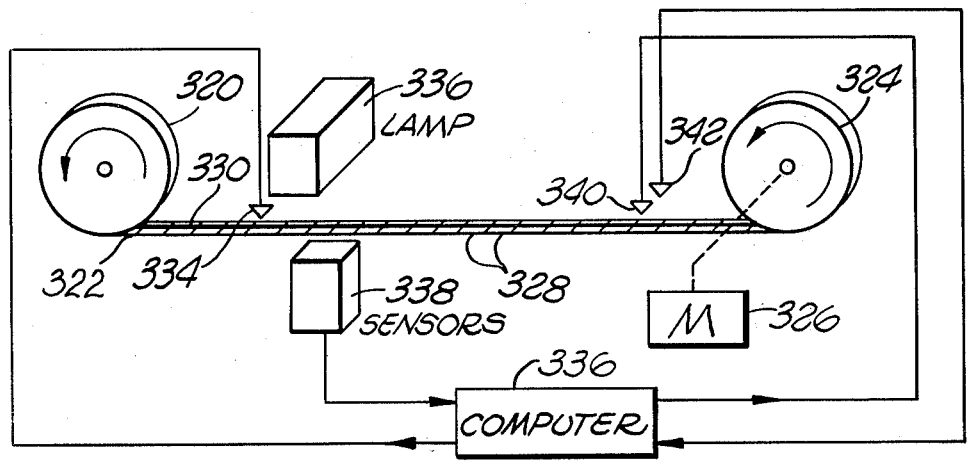
FIG. 18 is a schematic view of a system in accordance with the present invention for continuous production of tags.

In the operation of the system of FIG. 18, as the tags 328 continously move from the reel 320 to the reel 324, each is sensed and recorded. After a magnetic marker is recorded on a tag, translucency signals are sensed for the tag. Selected samples of the translucency signals are then magnetically recorded on the tag, along with code designations to indicate the locations where the translucency signals were sensed. The tags 328 may then be subsequently tested for authenticity by comparing observed translucency patterns with the magnetically recorded values.

Considering the system of FIG. 18 in somewhat greater detail, tags 328 from the reel 320 first move under a read-write magnetic transducer head 334 which is coupled to a control computer 336. The head 334 senses each magnetic anomaly at the perforations between the tags 328 to provide a signal commanding the computer 336 to provide a signal for recording an index bit or start marker on the magnetic stripe 330.

After passing under the head 334, the tags 328 move between a light source or lamp 336 and a bank of photocell sensors 338. For example, the bank of sensors 338 may comprise three sensors for sensing translucency along three tracks on the continuous roll of tags 328 in the form of three analog signals.

The computer 336 receives the three analog translucency signals from the sensors 338 and formulates select digital representations. For example, each of the three analog signals might be sampled at three distinct instants to provide an aggregation of nine digital values.

The instants of sampling are related by the computer 336 to specific locations on the associated tag 328. Thus, while the samples are converted to representative digital formats, the locations from which they were sensed are defined in terms of offsets along the tag length. Such data is formulated into a representative code word before the associated tag reaches a pair of magnetic transducer heads 340 and 342.

The head 340 senses the index bits recorded on the tags 328 by the head 334 and thereby actuates the head 342 to record the code word representative of locations and values for a specific tag 328. The description of a specific operating sequence with regard to one tag 328 will summarize the operation of the system.

As each of the perforations separating a pair of tags 328 move under the head 334, the anomaly is sensed indicating that a fresh tag 328 is about to move between the sensors 338 and the lamp 336. As such movement occurs, analog translucency signals are provided to the computer in a time-space relationship with the tag 328 being observed. Such signals are processed by the computer, specifically being sampled at select locations, and the samples converted to a digital form. Signals definitive of the sampled locations are also developed in digital form. Accordingly, the digital signals indicate specific locations on the tag 328 under consideration and the translucency at such locations. A representative code word (encrypted) is then formed for recording on the stripe 330 of the tab 328.

When the tag 328 of concern reaches the heads 340 and 342, the recorded index bit is sensed by the head 340 and the code word is then recorded by the head 342. Accordingly, each tag 328 is sensed and recorded as a completed authenticator. Of course, as explained above, the tags 328 may comprise labels or other authentication devices, to be verified as described above.

Figure 19:
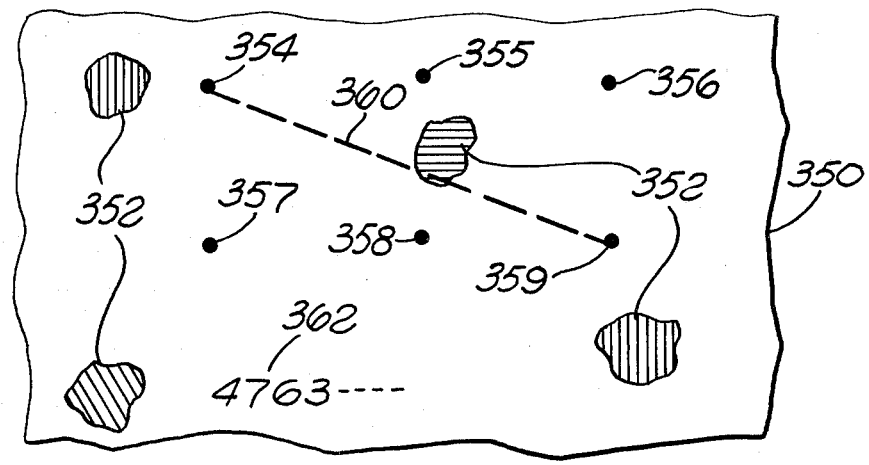
FIG. 19 is a fragmentary plan view of a document of the present invention incorporating authentication means.

With regard to types of authenticators, still another examplary form might comprise any of a variety of financial paper. In that regard, it is common practice to print colored dots on checks and the like to increase the burden of counterfeiting. The addition of techniques of the present invention to such media would greatly enhance the security of such financial paper. To consider a specific process, reference will now be made to FIG. 19.

A fragment of paper 350 is illustrated (FIG. 19) which may be of bond quality and may comprise a portion of any of a variety of documents important for authentication. The paper 350 carries printed dots 352 that are of various colors and tend to bleed somewhat irregularly into the texture of the paper. The pattern of the colored dots 352 may be quite irregular.

In addition to the colored dots 352, the paper 350 also carries engraved dots (only six of such dots are shown) specifically dots 354, 355, 356, 357, 358 and 359 which may be black and are located to define a rectangular array. The engraved dots are precise and cleanly defined.

Generally, the authenticator is used by selecting a path in relation to certain of the engraved dots, e.g., a path 360 between the dots 354 and 359. The measurable but not practicably duplicable characteristic is then sensed along the path 360 to provide a signal that identifies the paper 350. The path 360, as well as the observed analog signal may be registered in an encrypted numeral 362. Accordingly, authentication of the paper 350 involves decoding the numeral 362, sensing the measurable but not practicably duplicable characteristic along the path 360, then comparing (at least in part) the sensed characteristic with the values registered for that characteristic.

A document incorporating the paper 350 may carry a substantial number of the engraved dots, as dot 354, which are used as reference points to specify paths, e.g., path 360. A system processing the document would key onto the engraved dots to establish a reference position from which the selected path could be sensed. As indicated above, the path might be observed for any of a variety of measurable but not practicably duplicable characteristics, as translucency. As used herein (including use in the claims) the phrase "measurable but not practicably duplicable characteristic" means a characteristic that varies randomly from authenticator to authenticator, as opposed to a predetermined fixed or coded pattern placed on each authenticator in a group.

As will be readily appreciated from the above illustrative embodiments, the system hereof is susceptible to a great number of modifications and deviations within the basic conceptual framework. Accordingly, the scope hereof is deemed to be as set forth in the claims below.

What is claimed is:

1. An authenticator device for verifying authenticity comprising:
    a sheet of medium having a varying random characteristic over an area of said sheet, said characteristic being inherent in the composition of said medium; and
    machine-readable indicia on said sheet of medium, said indicia being decodable to specify the characteristic of said sheet at a specific area location.

2. An authenticator according to claim 1 wherein said sheet of medium has a varying random characteristic over the complete area of said sheet.

3. An authenticator according to claim 1 wherein said machine-readable indicia is decodable to explicitly indicate at least one specific area location on said sheet and the characteristic thereat.

4. An authenticator according to claim 1 wherein said machine-readable indicia includes indicia defining a corner on said space.

5. An authenticator according to claim 1 wherein said varying random characteristic of said medium as indicated by said indicia comprises a characteristic that may be sensed by irradiating said sheet.

6. An authenticator according to claim 1 wherein said characteristic of said medium comprises the translucency of said sheet.

7. An authenticator according to claim 1 wherein said reference medium comprises a fibrous material to define varying random characteristics apparent by irradiation.

8. An authenticator according to claim 1 wherein said reference medium comprises a paper-like material of randomly oriented fibers.

9. An authenticator according to claim 1 wherein said machine-readable indicia comprises print defining readable symbols and a corner indicia defining a space.

10. An authenticator according to claim 1 wherein said authenticator further includes a magnetic stripe on said sheet of medium and said machine-readable indicia comprises a magnetic record on said stripe.

11. An authenticator according to claim 1 wherein said reference medium comprises an unmodified area of said sheet to variably modulate received light over the space of said sheet.

12. An authenticator according to claim 1 further including imprinted intelligence on said sheet positioned on at least said specific area location and further including at least one laminate on said sheet of medium.

13. An authenticator device according to claim 1 comprising a medium of uniform unmodified appearance.

14. A method of producing an authenticator device comprising the steps of:
    selecting a sheet of medium having a varying random characteristic over an area of said sheet, said characteristic being inherent in the composition of said medium; and
    specifying at least one location on said sheet as location data;
    measuring said characteristic at said specified location on said sheet as identification data; and
    from said data, recording on said sheet machine-readable indicia decodable to specify said characteristic of said sheet at said location on said sheet.

15. A method according to claim 14 wherein said step of measuring comprises sensing the translucency of said sheet at said specified location.

16. A method according to claim 14 wherein said sheet of medium has said varying random characteristic over the complete area of said sheet.

17. A method according to claim 14 wherein said indicia on said sheet is decodable to specify said location data and said identification data.

18. A method according to claim 14 further including the step of cryptographically encoding said data prior to recording on said sheet.

19. A method according to claim 14 wherein said step of measuring comprises subjecting said medium to radiant energy to modulate such energy as a measurement of said characteristic.

20. A method according to claim 14 wherein said step of measuring includes formulating digital representation of said characteristic at said specified location.

21. A method according to claim 14 further including the step of cryptographically encoding said digital representation for recording on said sheet.

22. A verification method comprising the steps of:
selecting a sheet of medium having a varying random characteristic of an area of said sheet, said characteristic being inherent in the composition of said medium; and
specifying at least one location in said area as location data;
measuring said characteristic at said specified location on said sheet as identification data;
from said data, recording on said sheet machine-readable indicia decodable to specify an indication of the measurement of said characteristic of said sheet for at least said one specified location on said sheet;
subsequently measuring said characteristic for at least said specified location on said sheet to provide confirmation data; and
comparing said identification data with said confirmation data to verify the authenticity of said sheet.

23. A method according to claim 22 wherein said sheet of medium has said varying random characteristic over the complete area of said sheet.

24. A method according to claim 22 wherein said indicia on said sheet is decodable to specify said location data and said identification data.

25. A method according to claim 22 wherein said step of measuring comprises subjecting said medium to radiant energy to modulate such energy as a measurement of said characteristic.

26. A method according to claim 22 wherein said step of measuring includes formulating digital representation of said characteristic at said specified location.

27. A method according to claim 22 wherein the steps of measuring said characteristic comprises measuring translucency.

28. A system for producing authenticators using sheets of medium having an area of uniform visual appearance in material, with each sheet having a varying random characteristic over said area of said sheet, said characteristic being inherent in the composition of the medium, comprising:
means for defining select location data representative of one or more predetermined locations in said area;
radiant energy means for measuring said characteristic of a sheet at said predetermined locations to provide identification data; and
means for registering at least some of said location data and some of said identification data to subsequently verify a sheet.

29. A system according to claim 28 wherein said radiant energy means comprises means for illuminating a sheet on one side thereof and sensing radiation on the other side thereof.

30. A system according to claim 28 wherein said radiant energy means comprises means to irradiate a sheet to provide modulated radiation in accordance with said characteristic and means to sense said modulated radiation as a representative electrical signal.

31. A system according to claim 28 wherein said means for registering comprises means for recording on a sheet.

32. A system according to claim 28 wherein said means for registering further includes means for reducing said representative electrical signal to digital signals.

33. A system for verifying authenticators in the form of sheets having areas of substantially uniform-appearing material medium, each sheet having a varying random characteristic over the space of said sheet, said characteristic being inherent in the composition of the medium, comprising:
means for sensing an authenticator to provide location data and first identification data for a specific authenticator;
radiant energy means for measuring said characteristic of a sheet at locations according to said location data to provide second identification data; and
means for comparing said first and second identification data to provide an indication of verification.

34. A system according to claim 33 wherein said means for sensing includes means for defining a rectangular array of locations on said authenticator and means for identifying plural locations in said array to provide said first identification data.

35. A system according to claim 33 wherein said means for identifying plural locations comprises means for decoding said location data to specify by repeated use of decoded data, plural locations in said array.

36. A system according to claim 33 wherein said radiant energy means comprises means for sensing the translucency characteristic of said sheet.

37. A system according to claim 33 wherein said means for sensing comprises means for providing digital signal representations of said first identification data.

38. A system according to claim 33 wherein said radiant energy means includes amplifier means to non-linearly amplify signals representative of said second identification data.

39. A system according to claim 33 wherein said means for sensing comprises optical reader means.

40. A system according to claim 33 wherein said means for sensing comprises magnetic reader means.

* * * * *

UNITED STATES PATENT AND TRADEMARK OFFICE
CERTIFICATE OF CORRECTION

PATENT NO. : 4,423,415

DATED : December 27, 1983

INVENTOR(S) : Robert N. Goldman

It is certified that error appears in the above-identified patent and that said Letters Patent are hereby corrected as shown below:

| Column | Line | |
|---|---|---|
| 2 | 18 | "such" should be --Such-- |
| 4 | 13 | "forms" should be --form-- |
| 8 | 68 | "signals" should be --signal-- |
| 10 | 19 | "digit" should be --digits-- |
| 10 | 61 | "twenty-five" should be --twenty-six-- |
| 14 | 64 | "analogdigital" should be --analog-digital-- |
| 20 | 46 | "Fig. 10" should be --Fig. 11-- |
| 20 | 46 | "215" should be --216-- |
| 20 | 54 | after "and", "the" should be deleted |
| 21 | 10 | "duplicate" should be --duplicable-- |
| 21 | 37 | "magentic" should be --magnetic-- |
| 21 | 43 | "of" should be --or-- |
| 21 | 44 | after "authenticity", --or-- should be inserted |
| 23 | 39 | "examplary" should be --exemplary-- |
| 27 | 4 | "examplary" should be --exemplary-- |

Signed and Sealed this

Twenty-fourth Day of April 1984

[SEAL]

Attest:

GERALD J. MOSSINGHOFF

Attesting Officer  Commissioner of Patents and Trademarks